(12) United States Patent
Wilson

(10) Patent No.: US 9,514,482 B2
(45) Date of Patent: Dec. 6, 2016

(54) SYSTEM FOR MANAGING VEHICLE INFORMATION DISPLAYED ON A PLURALITY OF VEHICLES

(71) Applicant: LFORMATION PTY LTD, Melbourne, Victoria (AU)

(72) Inventor: Paul Wilson, Victoria (AU)

(73) Assignee: LFORMATION PTY LTD, Melbourne (AU)

(*) Notice: Subject to any disclaimer, the term of this patent is extended or adjusted under 35 U.S.C. 154(b) by 0 days.

(21) Appl. No.: 14/438,166

(22) PCT Filed: Jul. 23, 2013

(86) PCT No.: PCT/AU2013/000812
§ 371 (c)(1),
(2) Date: Apr. 23, 2015

(87) PCT Pub. No.: WO2014/063179
PCT Pub. Date: May 1, 2014

(65) Prior Publication Data
US 2015/0269621 A1    Sep. 24, 2015

(30) Foreign Application Priority Data
Oct. 23, 2012    (AU) ............................ 2012904627

(51) Int. Cl.
*G06F 7/00* (2006.01)
*G06Q 30/00* (2012.01)
(Continued)

(52) U.S. Cl.
CPC ............. *G06Q 30/0265* (2013.01); *G06F 3/03* (2013.01); *G06F 3/14* (2013.01); *G06Q 10/0833* (2013.01); *G06Q 30/0266* (2013.01); *G06Q 50/26* (2013.01)

(58) Field of Classification Search
USPC ....................................... 701/33.4; 705/14.62
See application file for complete search history.

(56) References Cited

U.S. PATENT DOCUMENTS

| 5,635,693 A | * | 6/1997 | Benson ................... G07B 15/04 |
| | | | 340/10.33 |
| 2006/0111822 A1 | * | 5/2006 | Simon .................. B60R 25/1003 |
| | | | 701/468 |

(Continued)

*Primary Examiner* — Thomas G Black
*Assistant Examiner* — Tyler Paige
(74) *Attorney, Agent, or Firm* — Schwabe, Williamson & Wyatt P.C.

(57) ABSTRACT

A system for managing vehicle information displayed on a plurality of vehicles, said system including a central computer system and plurality of electronic display devices (EDD), each being associated with one of said vehicles and each being in electronic communication with the central computer system (CCS). The CCS includes one or more computer processors; computer readable data storage; and a CCS computer program stored on said data storage, the CCS program being executable by the processors to perform the steps of selecting a vehicle from said plurality of vehicles; generating vehicle data representing information about said vehicle; and sending said vehicle data to an associated one of said EDDs. Each one of said EDDs includes one or more computer processors; computer readable data storage; an EDD computer program stored on said data storage; and a visual display unit, the EDD program being executable by the processors to perform the steps of receiving vehicle data from the CCS representing information about an associated vehicle; and displaying said vehicle data representing information about the associated vehicle on the visual display unit.

17 Claims, 23 Drawing Sheets

(51) Int. Cl.
  *G06Q 30/02* (2012.01)
  *G06F 3/14* (2006.01)
  *G06Q 10/08* (2012.01)
  *G06Q 50/26* (2012.01)
  *G06F 3/03* (2006.01)

(56) References Cited

U.S. PATENT DOCUMENTS

| | | | | |
|---|---|---|---|---|
| 2007/0273534 | A1* | 11/2007 | McGinn | G07C 9/00174 340/572.8 |
| 2008/0231446 | A1* | 9/2008 | Cresto | G06Q 10/087 340/572.1 |
| 2008/0300988 | A1* | 12/2008 | Hoang | G06Q 30/02 705/14.62 |
| 2009/0313121 | A1* | 12/2009 | Post | G06Q 30/0255 705/14.53 |
| 2010/0094482 | A1* | 4/2010 | Schofield | G08G 1/205 701/2 |
| 2011/0063099 | A1* | 3/2011 | Miller | G06F 17/00 340/439 |
| 2011/0099036 | A1* | 4/2011 | Sarkissian | G06Q 10/02 705/5 |
| 2011/0106643 | A1* | 5/2011 | Berkowitz | G06Q 30/08 705/26.3 |
| 2011/0191203 | A1* | 8/2011 | Hughes | G06Q 30/0643 705/26.5 |
| 2011/0270706 | A1* | 11/2011 | Anspach | G06Q 30/0623 705/26.61 |
| 2012/0089328 | A1* | 4/2012 | Ellanti | G01C 21/26 701/425 |
| 2012/0130778 | A1* | 5/2012 | Cotton | G06Q 30/012 705/14.1 |
| 2014/0025253 | A1* | 1/2014 | Rybak | G07C 5/085 701/32.7 |
| 2014/0032422 | A1* | 1/2014 | Jones | G06Q 10/06 705/304 |
| 2015/0269621 | A1* | 9/2015 | Wilson | G06F 3/14 705/14.62 |

* cited by examiner

SYSTEM FOR MANAGING VEHICLE INFORMATION DISPLAYED ON A PLURALITY OF VEHICLES

TECHNICAL FIELD OF THE INVENTION

The present invention relates to a system for managing vehicle information displayed on a plurality of vehicles.

BACKGROUND OF THE INVENTION

Regulations from various government organisations require that specific vehicle information must be displayed to customers on the right rear window of a car which is being offered for sale. For example, a first type of form is used for vehicles that are subject to statutory warrantee; less than 10 years old and less than 100,000 km traveled. Alternatively, another type of form is used for vehicles not covered by statutory warrantee; over 10 years old or more than 100,000 km traveled.

The information must be affixed to the rear, right-side window (where possible) and typically includes:

The last owner of the motor car;
The distance traveled by the motor car entered by the motor car trader;
The cash price of the motor car;
A statement that the cash price does not include transfer fee or stamp duty;
Car registration period;
Car built date, compliance date, Date car first registered;
Model number;
Registration number;
Engine number;
If RWC is provided;
Statement informing the prospective purchaser of the warrantee period and the cooling off period;
LMCT identification, name;
Signature of the Motorcar trader; and
Space for the Purchaser to sign—upon sale of the motor car.

Currently, car dealerships mount a printed piece of paper (form) on the rear, right window of a vehicle. Any time vehicle information requires updating, such as a change in the drive away price or a change in the odometer reading, the dealer needs to print and mount a new form. This can be very inconvenient for both the dealership and the customer.

In addition to the above described difficulties, dealership owners are also faced with difficulties in locating vehicles around the lot. For example, a potential buyer may take a car for a test drive picking up the car from one point and dropping it off at another. The vehicle has changed positions on the lot and it may be difficult to later locate.

Further, it is sometimes the case that a person taking a car for a test drive may violate a traffic rule. In the case of a speeding ticket, for example, the dealer may only learn of the incident a week or two after the violation has occurred. In a busy dealership, it can be a difficult process to track backwards to positively identify who was driving the vehicle at the time when the violation occurred.

It is generally desirable to overcome or ameliorate one or more of the above mentioned difficulties, or at least provide a useful alternative.

SUMMARY OF THE INVENTION

In accordance with one the invention, there is provided a system for managing vehicle information displayed on a plurality of vehicles, said system including a central computer system and plurality of electronic display devices (EDD), each being associated with one of said vehicles and each being in electronic communication with the central computer system (CCS), wherein:

said CCS includes one or more computer processors; computer readable data storage; and a CCS computer program stored on said data storage, the CCS program being executable by the processors to perform the steps of:
(a) selecting a vehicle from said plurality of vehicles;
(b) generating vehicle data representing information about said vehicle; and
(c) sending said vehicle data to an associated one of said EDDs, and each one of said EDDs includes one or more computer processors; computer readable data storage; an EDD computer program stored on said data storage; and a visual display unit, the EDD program being executable by the processors to perform the steps of:
(a) receiving vehicle data from the CCS representing information about an associated vehicle; and
(b) displaying said vehicle data representing information about the associated vehicle on the visual display unit.

Preferably, the CCS program being executable by the processors to perform the steps of:
(a) associating a vehicle with an EDD by sending an association request to an EDD;
(b) receiving an association confirmation from said EDD; and
(c) recording said association in said data storage.

Preferably, the EDD program being executable by the processors to perform the steps of:
(a) receiving an association request from the CCS;
(b) sending an association confirmation to the CCS; and
(c) recording said association in said data storage.

Preferably, the EDD program being executable by the processors to perform the steps of:
(a) recording log information about the associated vehicle; and
(b) sending said log information to the CCS.

Preferably, the CCS program being executable by the processors to perform the steps of:
(d) receiving log information from one of said EDDs; and
(e) recording the log information in said data storage.

In accordance with the invention, there is also provided a central computer system (CCS) for managing vehicle information displayed on electronic display devices (EDDs) displayed on a plurality of vehicles, including one or more computer processors; computer readable data storage; and a CCS computer program stored on said data storage, the CCS program being executable by the processors to perform the steps of
(a) selecting a vehicle from said plurality of vehicles;
(b) generating vehicle data representing information about said vehicle; and
(c) sending said vehicle data to an associated one of said EDDs, and Preferably, the CCS program being executable by the processors to perform the steps of:
(a) associating a vehicle with an EDD by sending an association request to an EDD;
(b) receiving an association confirmation from said EDD; and
(c) recording said association in said data storage.

Preferably, the CCS program being executable by the processors to perform the steps of:

(a) receiving log information from one of said EDDs; and
(b) recording the log information in said data storage.

In accordance with one the invention, there is also provided a computer program for a central computer system (CCS) for managing vehicle information displayed on electronic display devices (EDDs) displayed on a plurality of vehicles, including one or more computer processors; computer readable data storage; and a CCS computer program stored on said data storage, the CCS program being executable by the processors to perform the steps of:
  (a) selecting a vehicle from said plurality of vehicles;
  (b) generating vehicle data representing information about said vehicle; and
  (c) sending said vehicle data to an associated one of said EDDs, and Preferably, the CCS program being executable by the processors to perform the steps of:
  (a) associating a vehicle with an EDD by sending an association request to an EDD;
  (b) receiving an association confirmation from said EDD; and
  (c) storing said association in said data storage.

Preferably, the CCS program being executable by the processors to perform the steps of:
  (a) receiving log information from one of said EDDs; and
  (b) recording the log information in said data storage.

Preferably, the step of recording log information includes the step of recording vehicle usage.

In accordance with one the invention, there is also provided an electronic display device (EDD) for managing vehicle information, including one or more computer processors; computer readable data storage; an EDD computer program stored on said data storage; and a visual display unit, the EDD program being executable by the processors to perform the steps of:
  (a) receiving vehicle data from a central computer system (CCS) representing information about an associated vehicle; and
  (b) displaying said vehicle data representing information about the associated vehicle on the visual display unit.

Preferably, the EDD program being executable by the processors to perform the steps of:
  (a) receiving an association request from the CCS for an associated vehicle;
  (b) sending an association confirmation to the CCS; and
  (c) recording said association in said data storage.

Preferably, the EDD program being executable by the processors to perform the steps of:
  (a) recording log information about the associated vehicle; and
  (b) sending said log information to the CCS.

Preferably, the step of recording log information includes the step of recording vehicle usage.

In accordance with one the invention, there is also provided a computer program for an electronic display device (EDD) for managing vehicle information, including one or more computer processors; computer readable data storage; an EDD computer program stored on said data storage; and a visual display unit, the EDD program being executable by the processors to perform the steps of
  (a) receiving vehicle data from a central computer system (CCS) representing information about an associated vehicle; and
  (b) displaying said vehicle data representing information about the associated vehicle on the visual display unit.

Preferably, the EDD program being executable by the processors to perform the steps of (a) receiving an association request from the CCS for an associated vehicle;
  (b) sending an association confirmation to the CCS; and
  (c) recording said association in said data storage.

Preferably, the EDD program being executable by the processors to perform the steps of:
  (a) recording log information about the associated vehicle; and
  (b) sending said log information to the CCS.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Figure 1:
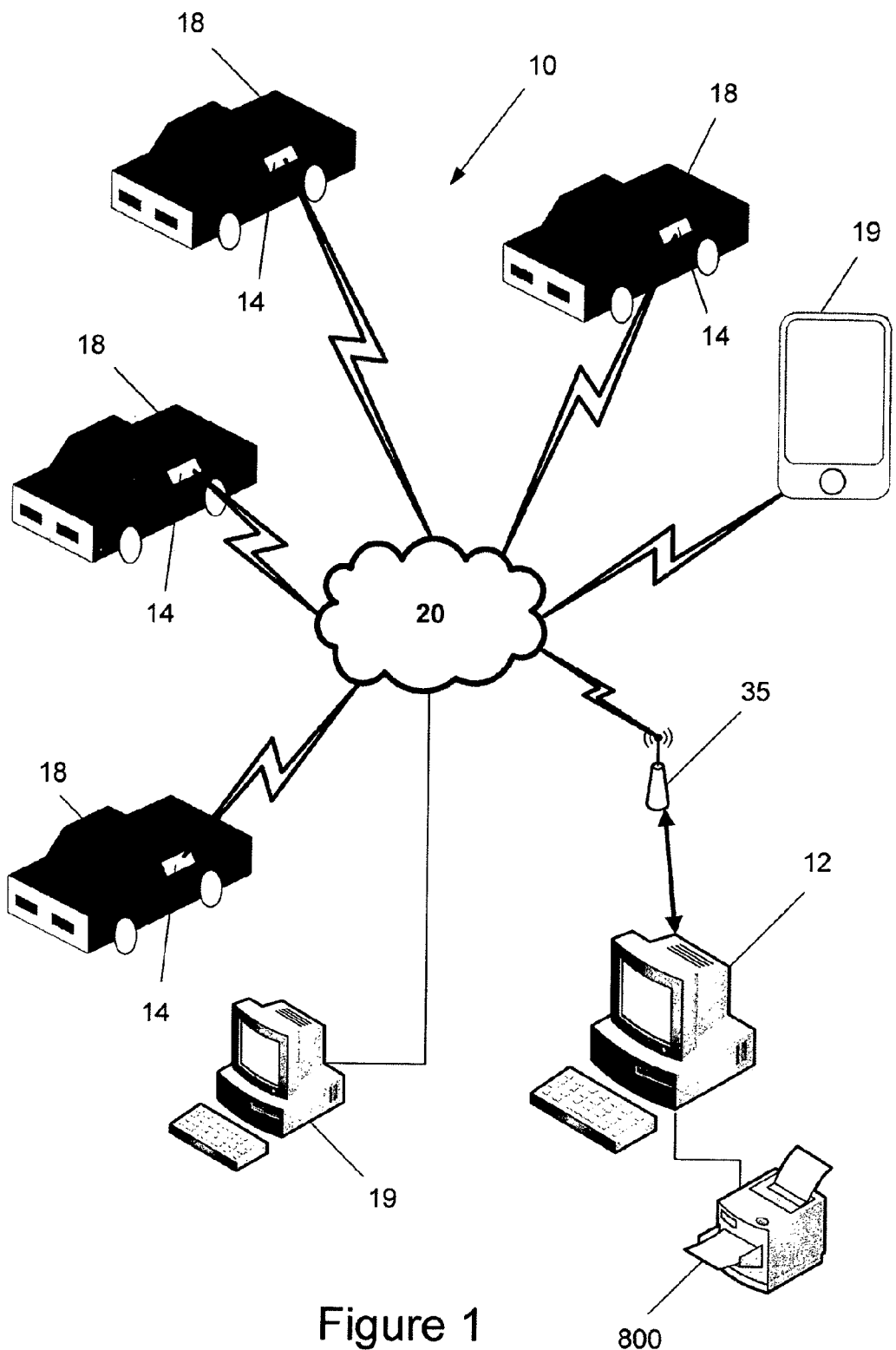
FIG. 1 is a schematic diagram of a system for managing vehicle information displayed on a plurality of vehicles.

The system 10 shown in FIG. 1 is used to manage vehicle information displayed on a plurality of vehicles 18. The system 10 includes a central computer system (CCS) 12 and plurality of electronic display devices (EDD) 14, each being associated with one of the vehicles 18 and each being in electronic communication with the CCS 12.

The EDDs 14 are adapted to be mounted on the rear-drivers-side window of respective vehicles 18, and will display all the vehicle information required by the car trader's legislation, such as dealership LMCT, odometer reading and drive away price.

Most of the information displayed on an EDD 14 during the time that the vehicle is offered for sale is static for example vehicle make, warrantee information and model registration numbers. However some of the display information is subject to change such as the offered sales prices and vehicle odometer mileage. The system 10 provides a means to automatically update the non-static information in response to vehicle 18 usage such as the number of test drives and the amount of time that the vehicle has been on offer in the car lot.

Once a car 18 has been sold, the device 14 may be reloaded with information about other vehicles 18.

The system 10 also provides means for recording a location of a vehicle 18 so that it can be located on the dealership. Further, the system 10 provides means for recording driver information and tracking vehicle 18 movement. As such, if a traffic violation occurs, then the person driving the vehicle at the time can be identified.

The System 10

Figure 2:
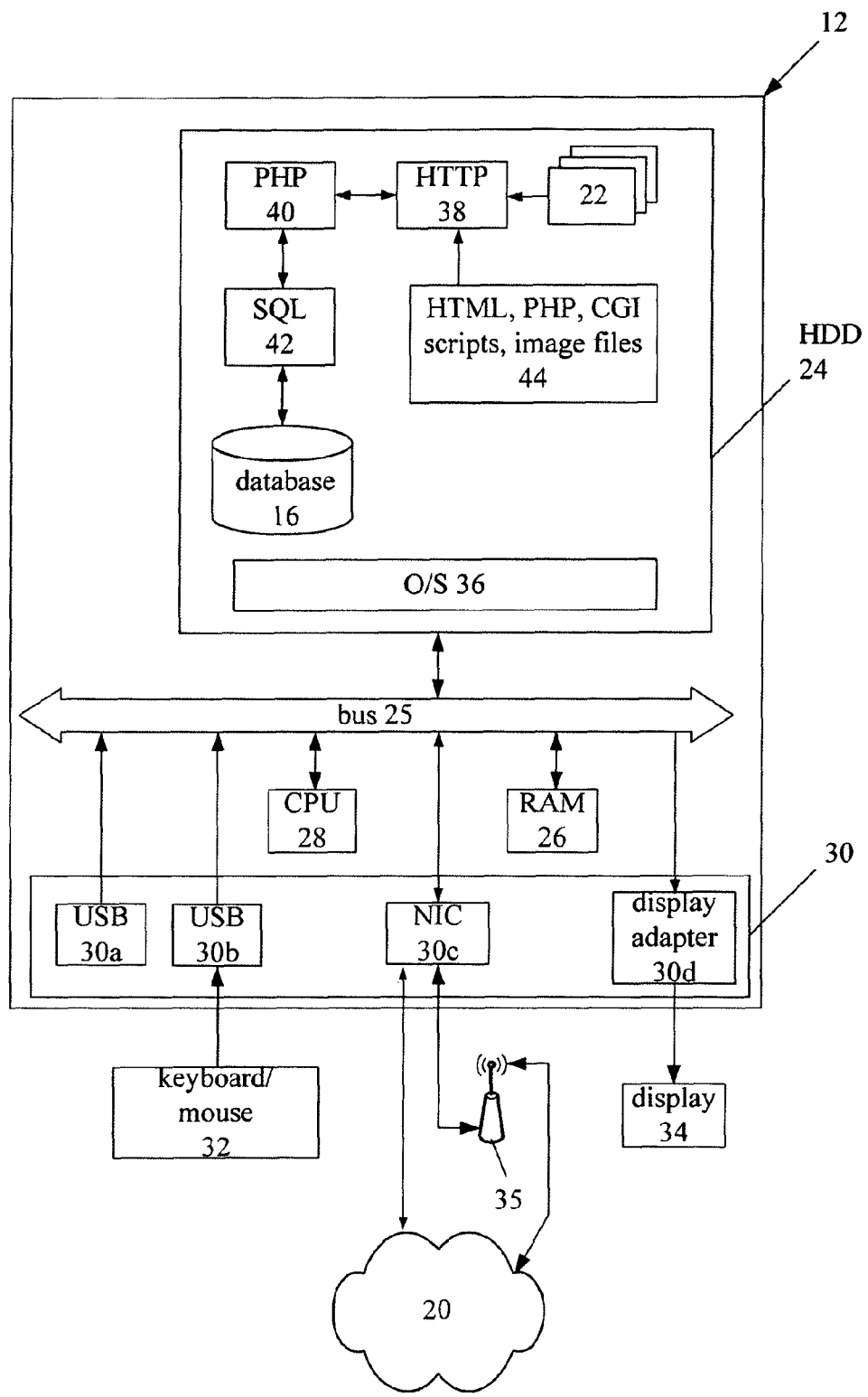
FIG. 2 is a schematic diagram of a computer system for implementing the system shown in FIG. 1.

The system 10 is provided by a central computer system (CCS) 12 that includes a server in communication with a database 16, as shown in FIG. 2. The computer system 12 is able to communicate with electronic display devices (EDDs) 14 coupled to vehicles 18 of the system 10 over a communications network 20 using standard communication protocols. The computer system 12 is also able to communicate with user equipment 19 of the system 10 over a communications network 20 using standard communication protocols.

The user equipment 19 can be a variety of communications devices such as personal computers; interactive televisions; hand held computers etc. Hand held computers include products such as iPhones, IPads, iPods and their android equivalents. The communications network 20 preferably includes the Internet, telecommunications networks and/or local area networks.

The components of the CCS 12 can be configured in a variety of ways. The components can be implemented entirely by software to be executed on standard computer server hardware, which may comprise one hardware unit or different computer hardware units distributed over various locations, some of which may require the communications network 20 for communication. A number of the components or parts thereof may also be implemented by application specific integrated circuits (ASICs).

In the example shown in FIG. 2, the CCS 12 is a commercially available server computer system based on a 32 bit or a 64 bit Intel architecture, and the processes and/or methods executed or performed by the CCS 12 are implemented in the form of programming instructions of one or more software components or modules 22 stored on non-volatile (e.g., hard disk) computer-readable storage (HDD) 24 associated with the computer system 12. At least parts of the software modules 22 could alternatively be implemented as one or more dedicated hardware components, such as application-specific integrated circuits (ASICs) and/or field programmable gate arrays (FPGAs).

The computer system 12 includes at least one or more of the following standard, commercially available, computer components, all interconnected by a bus 25:
1. random access memory (RAM) 26;
2. at least one computer processor 28, and
3. external computer interfaces 30:
   a. a first universal serial bus (USB) interface 30a for connection to EDDs;
   b. a second universal serial bus (USB) interface 30b (at least one of which is connected to one or more user-interface devices, such as a keyboard, a pointing device (e.g., a mouse 32 or touchpad),
   c. a network interface connector (NIC) 30c which connects the computer system 12 to a data communications network 18 via the WIFI modem 35; and
   d. a display adapter 30d, which is connected to a display device 34 such as a liquid-crystal display (LCD) panel device.

The computer system 12 includes a plurality of standard software modules, including:

1. an operating system (OS) 36 (e.g., Linux or Microsoft Windows);
2. web server software 38 (e.g., Apache, available at http://www.apache.org);
3. scripting language modules (e.g., personal home page or PHP, available at http://www.php.net, or Microsoft ASP); and
4. structured query language (SQL) modules 42 (e.g., MySQL, available from http://www.mysql.com), which allow data to be stored in and retrieved/accessed from an SQL database 16.

Together, the web server 38, scripting language 40, and SQL modules 42 provide the computer system 12 with the general ability to allow users of the Internet 20 with standard computing devices 19 equipped with standard web browser software to access the computer system 12 and in particular to provide data to and receive data from the database 16. It will be understood by those skilled in the art that the specific functionality provided by the system 12 to such users is provided by scripts accessible by the web server 38, including the one or more software modules 22 implementing the processes performed by the computer system 12, and also any other scripts and supporting data 44, including markup language (e.g., HTML, XML) scripts, PHP (or ASP), and/or CGI scripts, image files, style sheets, and the like.

The boundaries between the modules and components in the software modules 22 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the computer system 12 may be executed by a module (of software modules 22) or a portion of a module. The processes may be embodied in a machine-readable and/or computer-readable medium for configuring a computer system to execute the method. The software modules may be stored within and/or transmitted to a computer system memory to configure the computer system to perform the functions of the module.

The computer system 12 normally processes information according to a program (a list of internally stored instructions such as a particular application program and/or an operating system) and produces resultant output information via input/output (I/O) devices 30. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Preferred Embodiment of CCS 12

Figure 4:
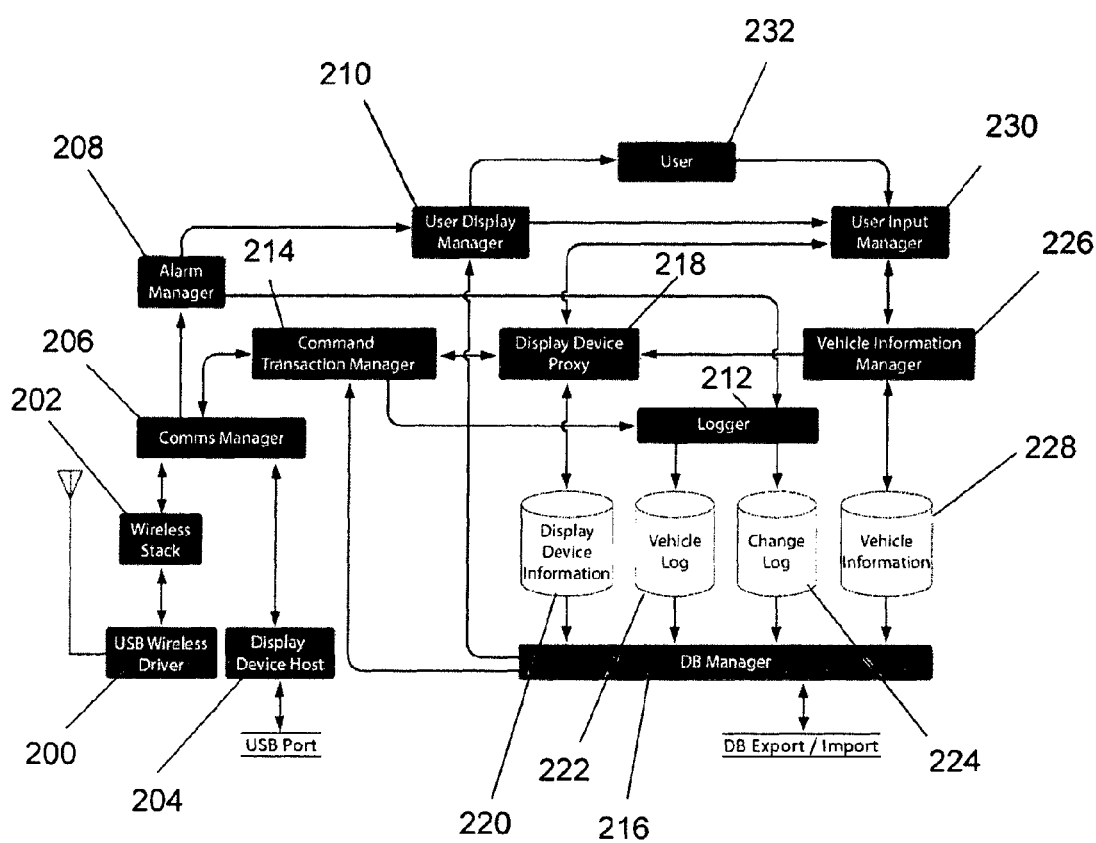
FIG. 4 is a functional block diagram of hardware components of an exemplary embodiment of the computer system shown in FIG. 2.
Figure 5:
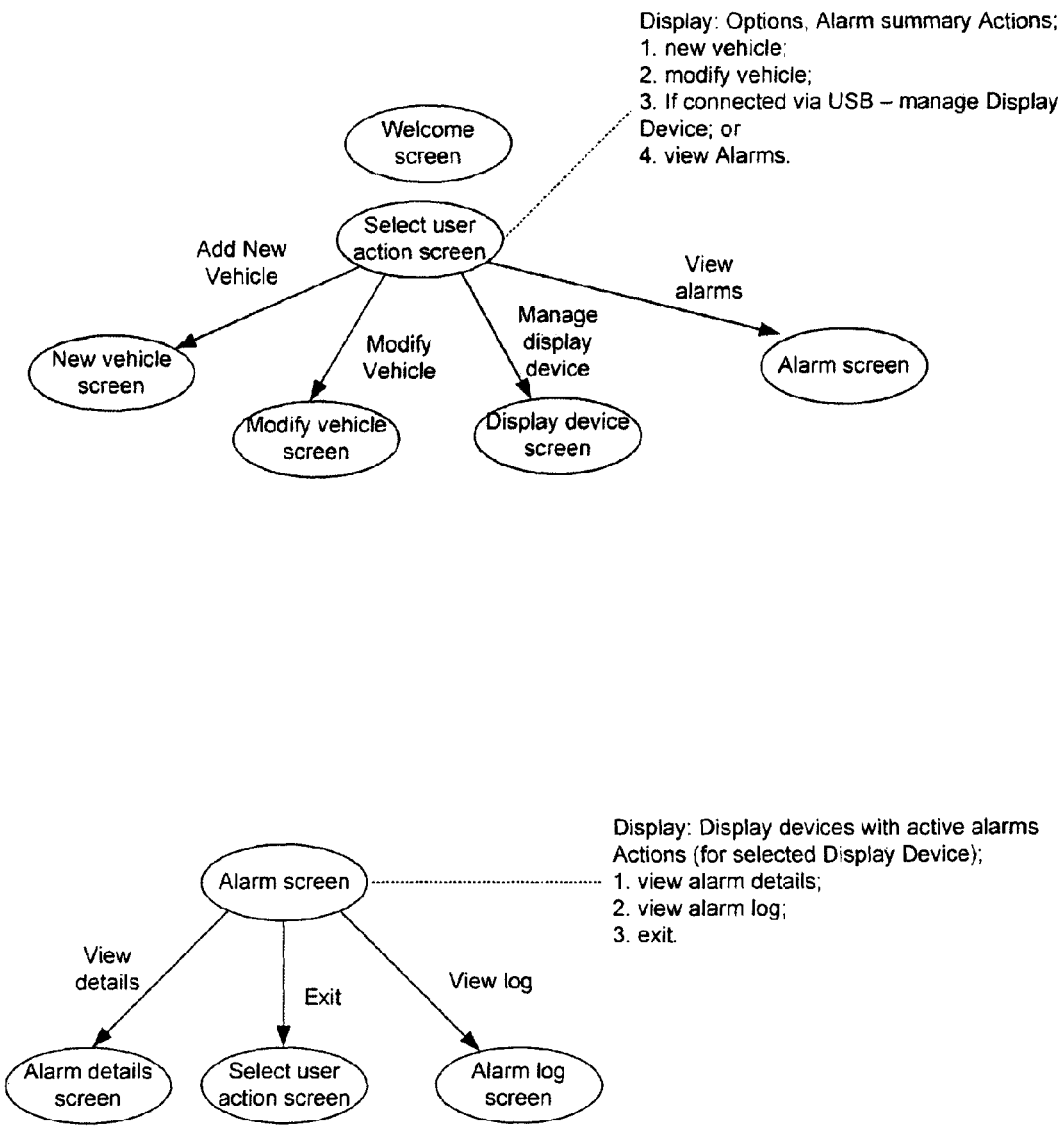
FIGS. 5 and 6 are exemplary embodiments of an event driven architecture of a software application of the computer system shown in FIG. 2.
Figure 6:
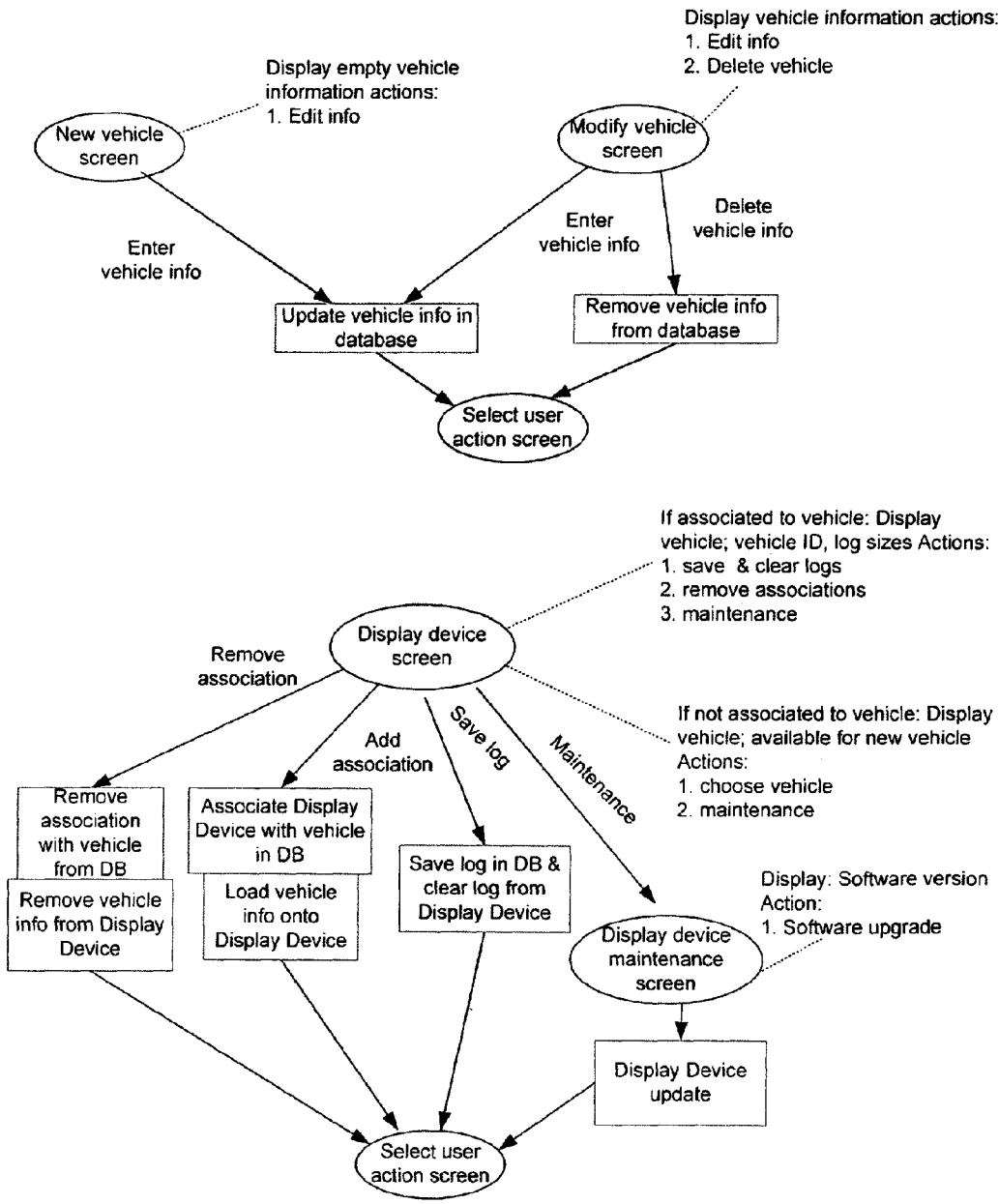
Figure 7:
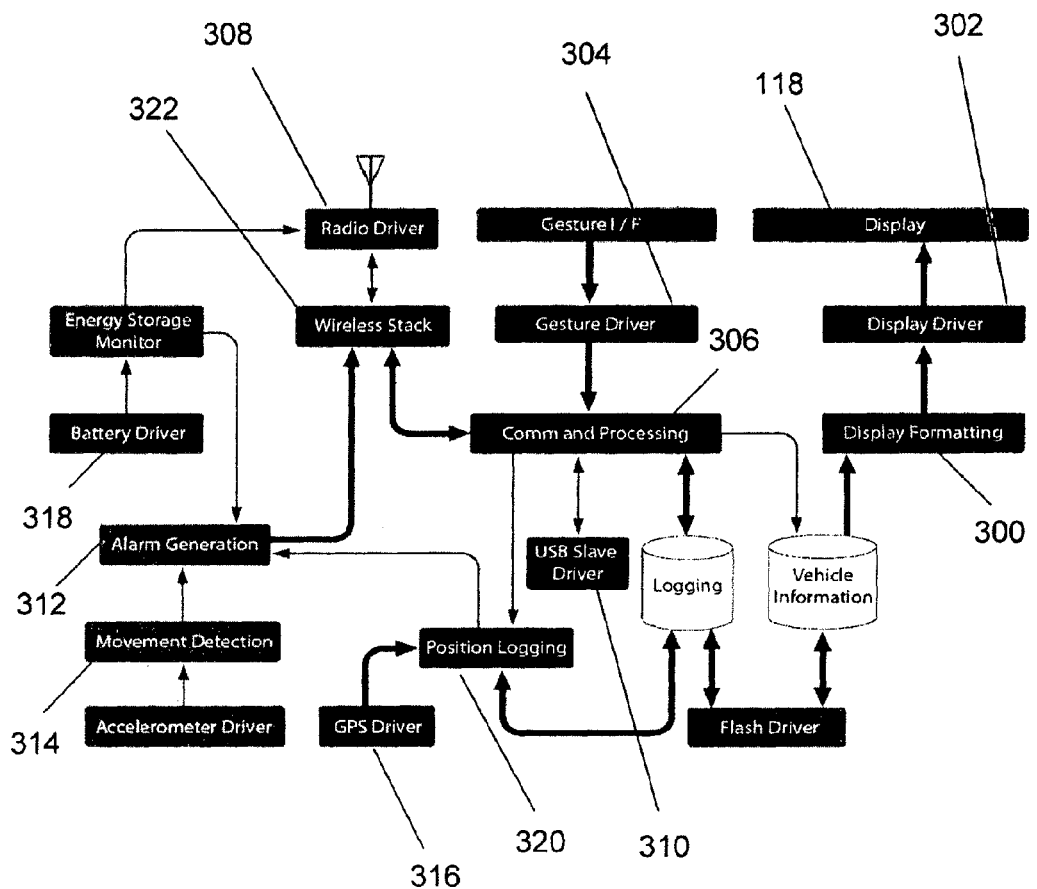
FIG. 7 is a functional block diagram of software components of an exemplary embodiment of the electronic display device shown in FIG. 3.

With reference to the exemplary embodiment shown in FIG. 4, the architecture of the software for the CCS 12 is preferably event driven, as depicted in FIG. 5 and FIG. 6. The CCS 12 is preferably a program running on the server. It shall have a connection to a radio interface 35 that will allow it to communicate wirelessly to the local EDDs 14.

As shown in FIG. 4, the computer program for the CCS 12 operates in the following manner:
a. a USB wireless driver 200 is in communication with a wireless stack 202;
b. a communications manager 206 is in communication with both the wireless stack 202 and a display device host 204;
c. an alarm manager 208 receives input from the communications manager 206 and outputs data to a user display manager 210 and a logger 212;
d. a command transaction manager 214 receives input from the database manager 216, and is in communication with the communications manager 206 and the display device proxy 218, the command transaction manager also outputs data to the logger 212;
e. the display device proxy communicates with the display device information database 220;
f. the logger inputs data into the vehicle log database 222 and the change log database 224;
i. a vehicle information manager 226 communicates with a vehicle information database 228; and
j. a user input manager 230 receives input from a user 232, the user display manager 210, the display device proxy 218 and the vehicle information manager 226.

The Electronic Display Devices 14

Figure 3:
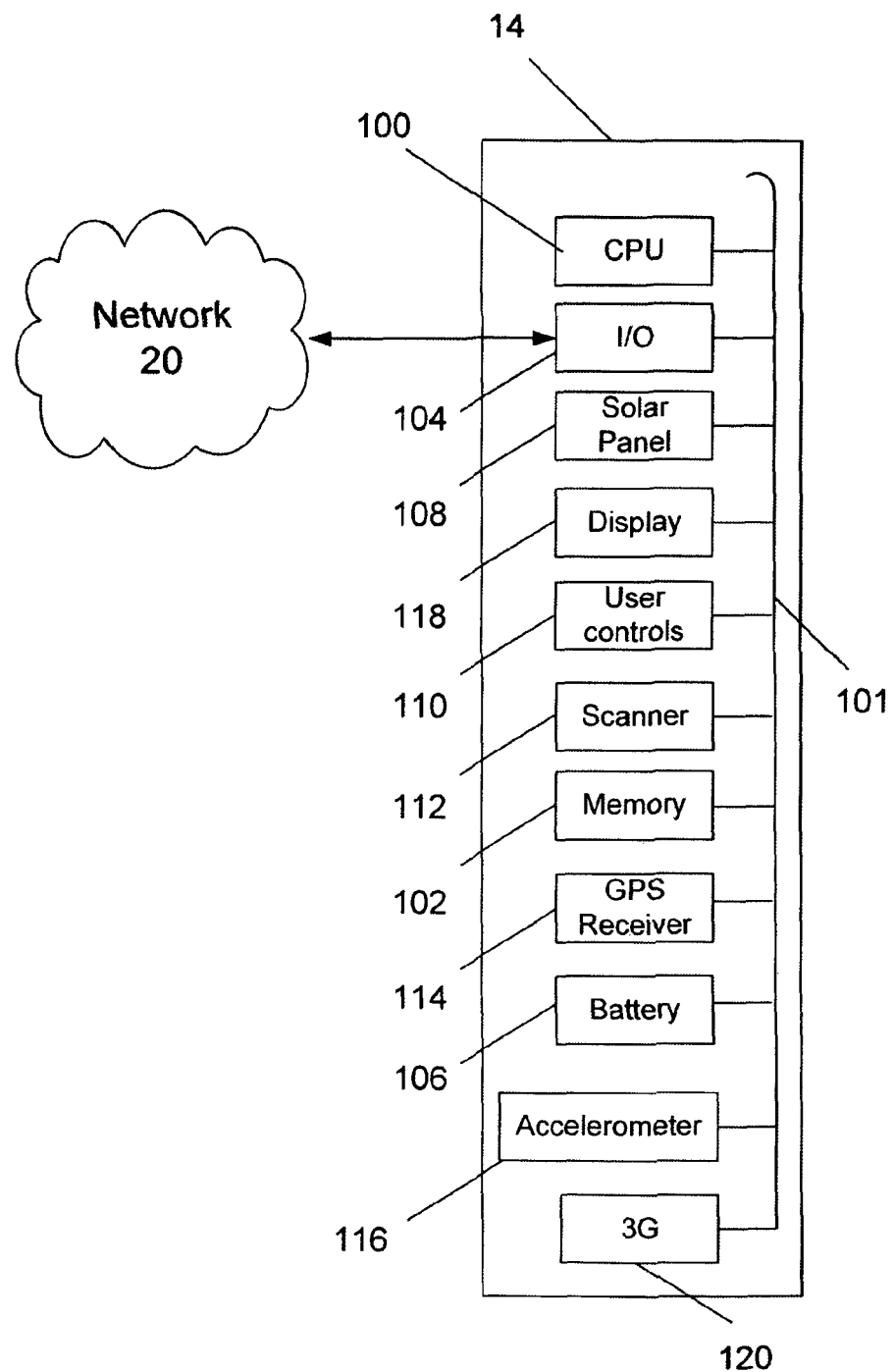
FIG. 3 is a schematic diagram of an electronic display device of the system shown in FIG. 1.

The EDDs 14 can be a variety of communications devices such as personal computers; interactive televisions; hand held computers etc. Hand held computers include products such as iPhones, IPads, iPods and their android equivalents. However, the EDDs 14 are described, by way of non-limiting example, by way of device 14 shown in FIG. 3. The communications network 20 preferably includes a wireless local area network that uses standard telecommunication protocols. As shown, the EDDs 14 each include the following components electrically connected by a bus 101:
a. at least one computer processor 100;
b. Memory 102;
c. input/out put interface. 104 including a universal serial bus (USB) interface for connection to the CCS;
d. a battery 106;
e. a solar panel 108 electrically coupled to the battery 106;
f. user interface controls 110;
g. digital recording apparatus 112, such as a digital camera or a digital scanner;
h. a position sensing device, such as a Global Positioning Receiver 114;
i. an accelerometer 116;
j. a visual display unit 118, such as a liquid-crystal display (LCD) panel device; and
k. a 3G interface 120.

The implementation of the display 118 may be though monochrome or colour LCD, or E-ink, or any other suitable device. The user controls 110 preferably includes a gesture or touch screen interface to allow interactions between the user and the display 118. The input/output interface preferably includes a wireless interface. The wireless interface is preferably used to update or reconfigure the vehicle data on the EDD 14. The position sensing device 114 preferably allows recording movements of the vehicle 18, including the distance, speed and duration of operation of the vehicle.

The wireless I/O interface 104 and the 3G interface 120 are used to provide additional networking and location information to external systems. The accelerometer 116 is be used to detect movement of the EDD 14.

The EDDs include a computer program stored in memory 102 which is capable of being executed by the one or more processors 100. The program includes the following software components:

1. Display Formatting 300 & Display Driver 302

These components operate to format the vehicle data to match requirements for presentation of the data on the display 118. They also handle difference between display types for Standard and Extended Versions. The standard version will consist of a segmented display, whereas the Extended version may be a graphical display, which will allow more animated displays or advertising.

2. Gesture Driver 304

The gesture driver 304 drives the hardware that recognises hand gestures from a customer viewing the EDD 14 and converts, using the comm. and processing driver 306 these gestures into commands to modify what is displayed (eg: display advertising, more vehicle details.

3. Command Processing 306

Monitors the radio 308 and serial control 310 interface connections and determines if the EDD 14 is communicating with one of its associated CCS 12. It also handles commands from the CCS 12 for updating/accessing vehicle data and logging information.

4. Alarm Generation 312

Handles events from hardware (ie: movement detection 314, GPS movement 316, Battery Level 318) and generate alarm message to the CCS 12.

5. Movement Detection 314 & Position Logging 320

These modules 314, 320 determine if the vehicle or display EDD 14 is moved. The movement of the EDD 14 results in an indication message being generated and sent to the CCS 12. The EDD 14 will activate the GPS positioning device 114 and periodically record the movement. It is anticipated that the wireless communications to the CCS 12 may be lost when the vehicle is taken for a test drive. When the EDD 14 is within the range of the CCS 12 the movement tracking information will be downloaded and stored in the CCS 12 data base. The EDD 14 may calculate the distance traveled and the information may be used to update the odometer value displayed.

6. USB Slave Driver 310

Detects when the EDD 14 is connected to a CCS 12, confirms that it is connected to its associated CCS 12. It will provide its unique id and access to its vehicle and logging information. If not connected to one of its associated CCS (s), access is limited to reconfiguring the EDD 14, not reading the vehicle or log information. Allow allocation to new CCS 12, which clears current Vehicle and Logging information 7. Wireless stack 322

Communications protocol stack appropriate to the wireless communications hardware selected Use of the System 10

Figure 8:
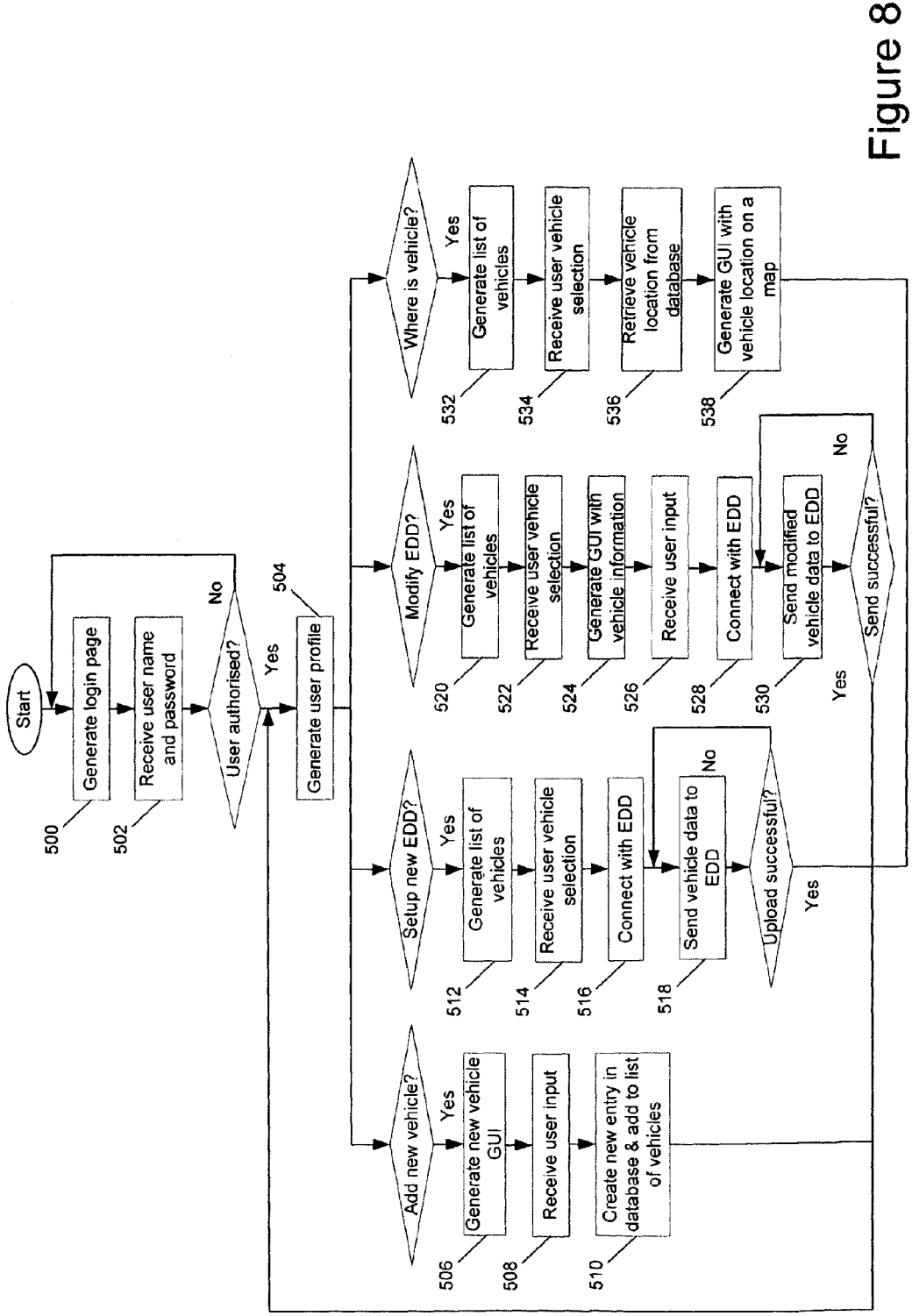
FIG. 8 is a flow diagram showing steps performed by the computer system shown in FIG. 2.

With reference to FIG. 8, a person can use the system 10 to manage vehicle information of a plurality of cars on a caryard by using his or her computer 19, for example, to accesses system's login page published by the CCS 12 over the Internet 20. The CCS 12 generates, at step 500, the a login page (not shown) that includes a text box for a user name and an associated text box for a user password. The CSS 12 receives, at step 502, the user name and password correct and compares them against an authorised list of users. If the user name and password matches an authorised user name and password, then the CCS 12 generates, at step 504, the user's profile page (not shown).

The profile page includes the following function buttons:
a. Add New Vehicle (not shown);
b. Setup New EDD (not shown);
c. Modify EDD (not shown); and
e. Where is Vehicle (not shown).

A detailed description of each one of these operations is set out below.

a. Add New Vehicle (Not Shown)

If the user wishes to add a new vehicle into the database 16, then he or she executes the "Add New Vehicle" function button. On execution of this button, the CCS 12 generates, at step 506, a graphical user interface (GUI) (not shown) that includes text boxes for the user to input information about the vehicle. For example, the GUI includes the following text boxes for the following information about the vehicle:
a. The last owner of the motor car;
b. The distance traveled by the motor car entered by the motor car trader;
c. The cash price of the motor car;
d. A statement that the cash price does not include transfer fee or stamp duty;
e. Car registration period;
f. Car built date, compliance date, Date car first registered;
g. Model number;
h. Registration number;
i. Engine number;
j. If RWC is provided, then a statement informing the prospective purchaser of the warrantee period and the cooling off period;
k. LMCT identification, name;
l. Signature of the Motorcar trader;

The GUI preferably also includes the following fields:
a. Vehicle location;
b. Number of test drives; and
c. Distance traveled during test drives; and
d. Customer details The system 12 receives, at step 508, data entered into the relevant text boxes by the user. Once the user has finished entering data into the relevant text boxes, he or she executes the "Submit" function button (not shown) and the CCS 12 creates, at step 510, a new entry in the database 16 for the vehicle and generates, at step 504, the user profile.

b. Setup New EDD (Not Shown)

If the user wishes to set up an EDD 14 for a vehicle, then he or she executes the "Setup New EDD" function button. On execution of this button, the CCS 12 generates, at step 512, a graphical user interface (GUI) (not shown) that includes a list of vehicles that are currently in the database 16. The user can select a vehicle from the list. The CCS 12 receives, at step 514, the user's selection and prompts, at step 516, the user to turn on an EDD 14. For example, the CCS 12 generates a message for display on the user's terminal 19.

Figure 9:
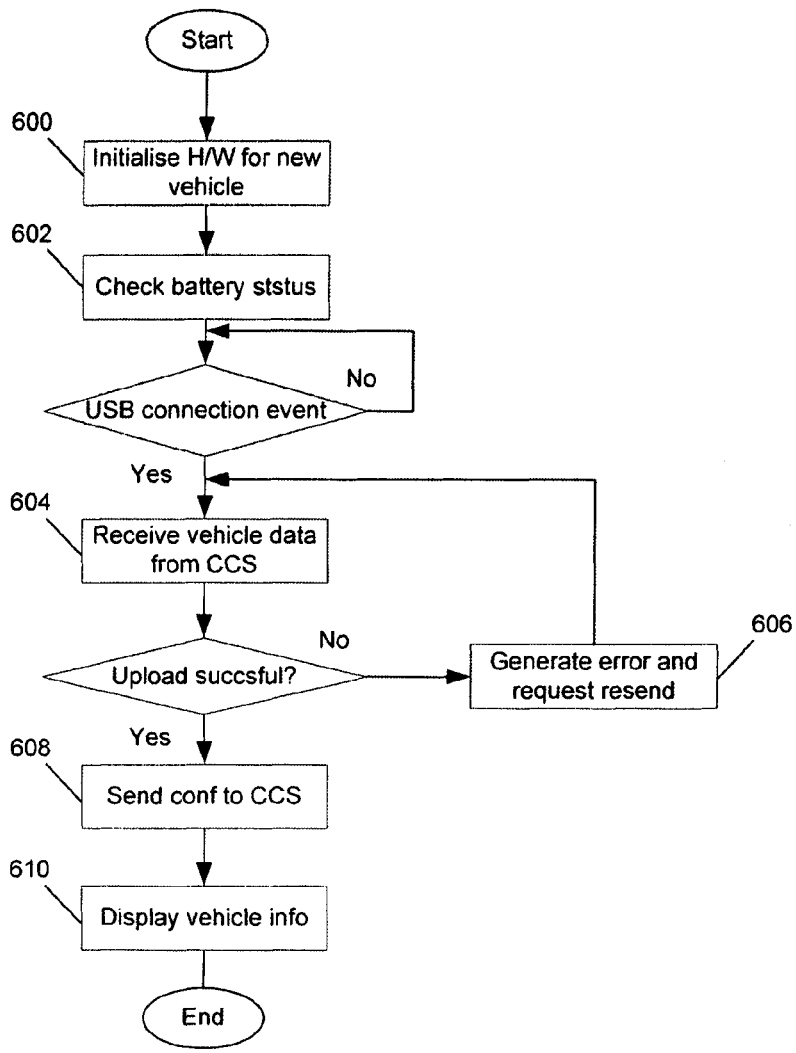
FIG. 9 is a flow diagram showing steps performed by the electronic display device shown in FIG. 3.

With reference to FIG. 9, when the EDD 14 is turned on, it initialises, at step 600, the hardware and software in readiness for association with a new vehicle 18. The EDD 14 then checks, at step 602, the battery and waits for a connection event.

The CCS 12 then prompts the user to connect the EDD 14 to the CCS 12 using a USB cable. Once the connection is detected by the CCS 12, it sends, at step 518, a message to the EDD 14 to set up a new vehicle and sends vehicle data representing information about the vehicle.

The EDD 14 receives, at step 604, vehicle data from the CCS and stores this data in the data storage 102. If an error occurred during the receiving process, then the EDD 14 sends, at step 606, an error message back to the CCS 12. Otherwise, the EDD 14 sends, at step 608, a confirmation message back to the CCS 12 that the data was received properly. The EDD 14 then, at step 610, displays the vehicle data on the visual display unit 118.

The CCS 12 waits for confirmation from the EDD 14 that the upload was successful and then generates, at step 504, the user profile. The user can then disconnect the EDD 14 from the CCS 12, take the EDD 14 over to the relevant vehicle 18 and connect it to the right rear window. The EDD 14 will then display the relevant vehicle information.

c. Modify EDD (Not Shown)

If the user wishes to update the information about a vehicle 18 being displayed by an EDD 14, then he or she executes the "Modify EDD" function button. On execution of this button, the CCS 12 generates, at step 520, a graphical user interface (GUI) (not shown) that includes a list of vehicles 18 that are currently in the database 16. The user can select a vehicle 18 from the list. The CCS 12 receives, at step 522, the user's selection and generates, at step 524, a GUI including editable data boxes of information about the vehicle 18.

The CCS 12 receives, at step 526, user input into the relevant data boxes and when the user executes the "Modify" function button, the CCS 12:
i. saves the changes into the database 16;
ii. establishes, at step 528, a connection with the relevant EDD 14; and
iii. sends, at step 530, the modified information about the vehicle 18 to the relevant EDD 14.

The CCS 12 waits for confirmation that the transfer successfully completed and then generates, at step 504, the user profile.

e. Where is Vehicle (Not Shown).

If the user wishes to locate a vehicle 18 on the caryard, then he or she executes the "Where is Vehicle" function button. On execution of this button, the CCS 12 generates, at step 532, a graphical user interface (GUI) (not shown) that includes a list of vehicles 18 that are currently in the database 16. The user can select a vehicle 18 from the list. The CCS 12 receives, at step 534, the user's selection and retrieves, 536, vehicle location information from the database 16. On receipt of this vehicle location information, the CCS 12 generates, at step 538, a GUI including a map including indicia showing the location of the vehicle. For example, the CCS 12 takes a GPS location of the vehicle stored in the database 16 and then uses Google Maps™ to show the location of the vehicle 18.

The EDDs 14

Figure 10:
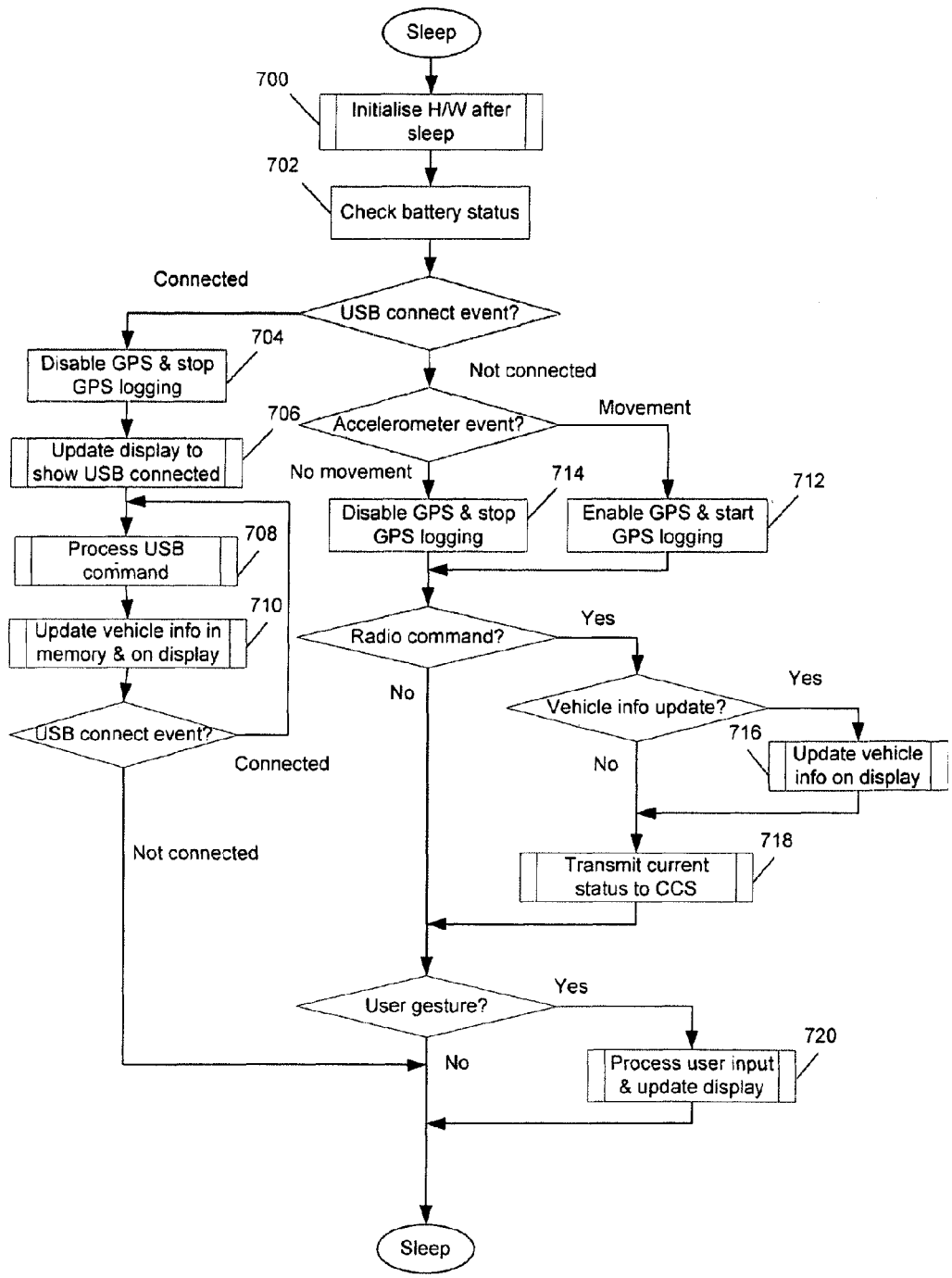
FIG. 10 is a flow diagram showing further steps performed by the electronic display device shown in FIG. 3.

With reference to FIG. 10, the EDD 14 is woken up by way of any one of the following events:
a. receipt of a radio signal from the CCS 12;
b. a timer flagging a change in state;
c. movement detected by an accelerometer 116;
d. detection of a USB connection to the EDD 14; and
e. user input by way of a user gesture, for example.

On detection of such an event, the EDD 14 initialises, at step 700, the hardware after a sleep. The EDD 14 also checks, at step 702, the life of the battery 106. If the event relates to a USB connection event, then the EDD 14:
a. disables, at step 704, the GPS receiver and stops the GPS logging;

b. updates, at step 706, the display 118 to show that the USB is connected;
c. processes, at step 708, the USB commands received from the CCS 12;
d. updates, at step 712, the vehicle information stored in memory 102 and updates the display 118 with the new info;
e. the EDD 14 then checks the connection status of the USB connection, if the connection has terminated, then the EDD 14 changes to sleep mode. Otherwise, the EDD 14 waits for the next command from the CCS 12.

Alternatively, if the event detected by the EDD 14 is not a USB connection event, then the EDD 14 determines whether the event relates to an accelerometer event. If it does, then the EDD 14 enables, at step 712, the GPS receiver and starts GPS logging. Alternatively, if it does not, then the EDD 14 disables, at step 714, the GPS receiver and stops the GPS logging.

In either case, if a radio event from the CCS 12 occurs, then the EDD 14 determines if the radio event relates to a vehicle 18 information update. In the event that it does, the EDD 14, at step 716, receives the updated information, stores the information, and updates the display 118 with the new information. In either case, the EDD 14 then transmits, at step 718, the current status to the CCS 12.

Again, in either case, if the event relates to a user gesture, then the EDD 14 processes, at step 720, the user input and updates the display with the images that result from the user input.

CCS 12 Polling

Figure 11:
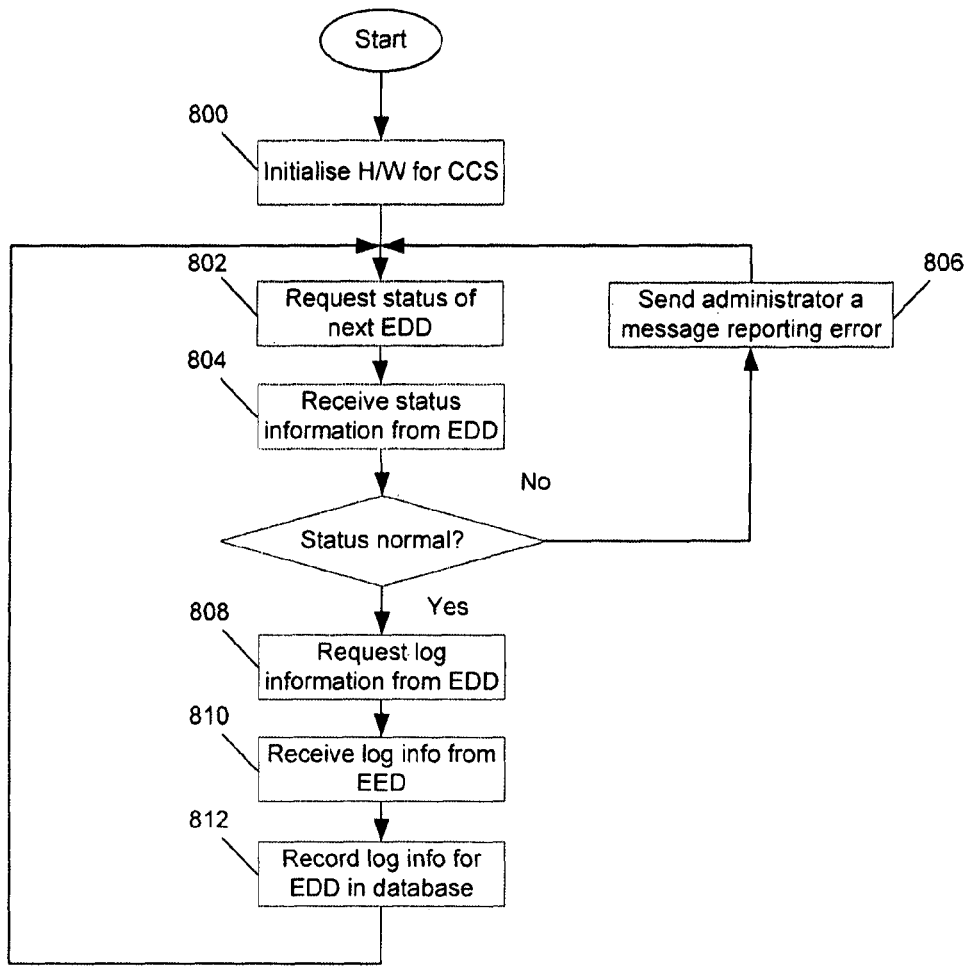
FIG. 11 is a flow diagram showing further steps performed by the computer system shown in FIG. 2.

When operating, the CCS 12 executes a program for polling the EDDs 14. With reference to FIG. 11, from start up, the CCS 12 performs the following operations in that regard:
a. the CCS 12 initialises, at step 800, the hardware for the CCS 12;
b. requests, at step 802, a status of an EDD 14;
c. receives, at step 804, a status check back from an EDD 14;
d. if the status is not normal, then the CCS sends, at step 806, a message to the CCS 12 administrator;
e. otherwise, the CCS 12 requests, at step 808, log information from the EDD 14;
f. receives, at step 810, from the EDD 14 log information;
g. records, at step 812, the log information in the database 16.

Additional Functionality

The CCS 12 also has the capacity to send additional information to an EDD 14. For example, in following the steps shown in FIG. 8 for modifying the EDD 114 information, the administrator has the capacity to send additional information such as an advertising sequence. On receipt of the additional information, the EDD 14 periodically alternates between displaying the information about the vehicle and the advertising sequence.

Alternatively, the user may use the user controls 110 to prompt the EDD 14 either the display vehicle data only or the advertising information only. Further the user may use the user controls 110 to prompt the EDD 14 any additional information about the vehicle 18.

The CCS 12 is preferably in electric communication with a printer 800. The CCS 12 includes a program being executable by the processors to perform the steps of:
(a) selecting one of the vehicles 18;
(b) retrieving data representing information about the vehicle 18 from the data storage 16; and
(c) sending said data representing information about the vehicle 18 to the printer 800 to produce a printed document.

The printed document preferably includes one or more of the following vehicle data:
(a) vehicle make;
(b) vehicle warrantee information;
(c) model number and registration number;
(d) offered sale prices;
(e) vehicle odometer readings;
(f) dealership LMCT;
(g) drive away price;
(h) the last owner of the motor car;
(i) the distance traveled by the motor car entered by the motor car trader;
(j) a statement that the cash price does not include transfer fee or stamp duty;
(k) car registration period;
(l) car built date, compliance date, date car first registered;
(m) engine number;
(n) if RWC is provided;
(o) statement informing the prospective purchaser of the warrantee period and the cooling off period;
(p) signature of the Motorcar trader; and
(q) space for the Purchaser to sign—upon sale of the motor car Exemplary Use of an EDD 14

As above-mentioned, the system 10 provides means for recording driver information and tracking vehicle 18 movement. A sales person can use an EDD 14 to enter and record this information. With reference to FIG. 10, this process may be initiated by the sales person waving his or her hand over the EDD 14 which will detect the gesture and process, at step 720, the user input. Alternatively, the sales person could use the user controls 110 to begin this process. In response to this, the EDD 14 will generate a display (not shown) including a list of menu options.

Figure 12:
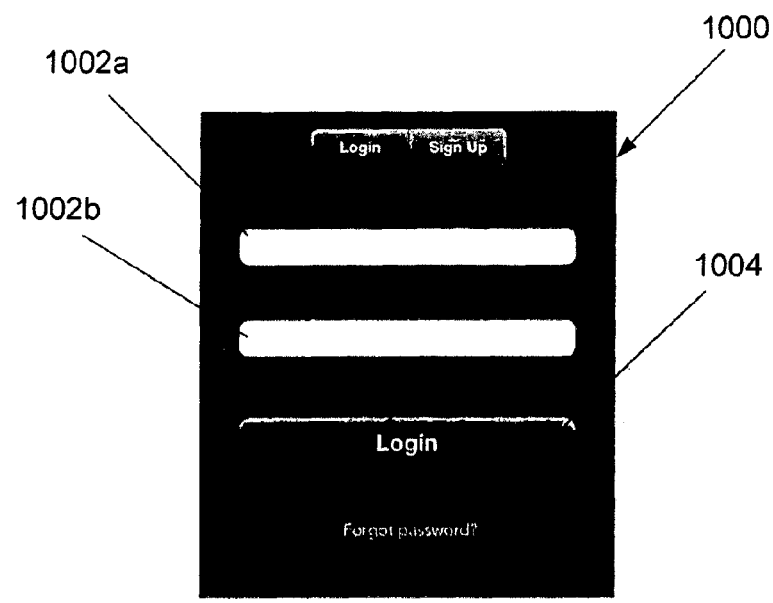
FIGS. 12 to 37 are views displayed on the electronic display device shown in FIG. 3 and/or the personal computer device shown in FIG. 1.
Figure 13:
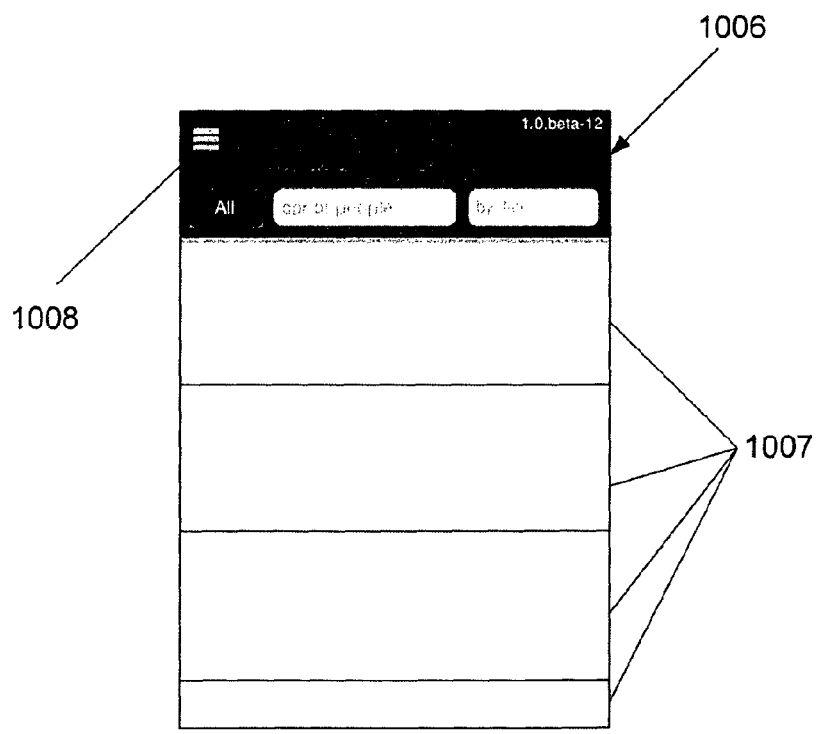

The user cal elect to access his or her profile on the system 12 by selecting the "Login" menu option (not shown). In response to this, the EDD 14 contacts the CCS 12 over the network 20, requests the login page, and displays it on the display 118. As shown in FIG. 12, Login view 1000 includes text boxes 1002a, 1002b for respectively receiving user login and password data. On detection of the user executing the "Login" function button 1004, the EDD 14 send the user name and password to the CCS 12 for authorisation. If the user name and password is valid, the CCS 12 send the EED 14 back the user profile view 1006 shown in FIG. 13 for display. The profile 1006 includes an activity feed 1007 which does not include any entries.

Figure 14:
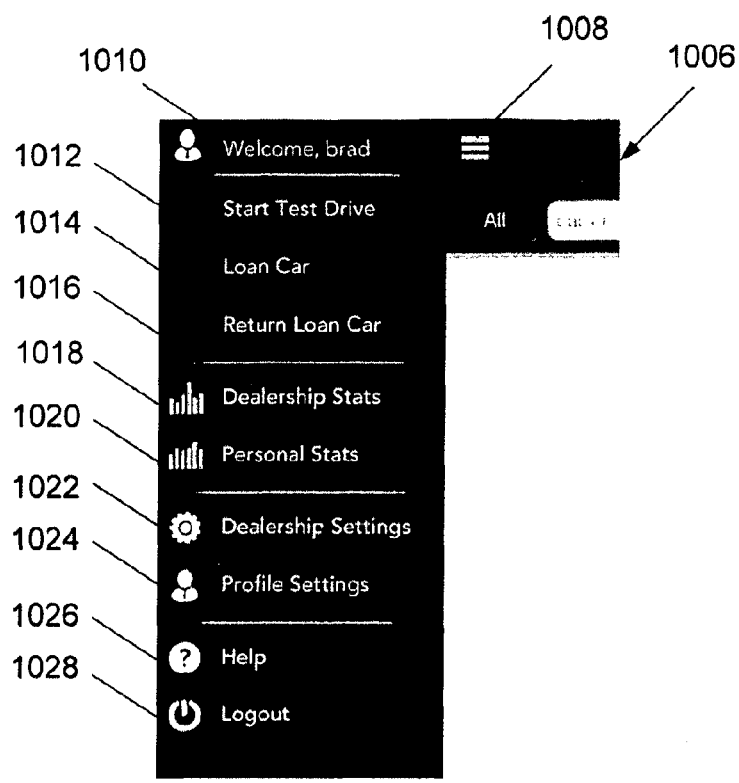
Figure 15:
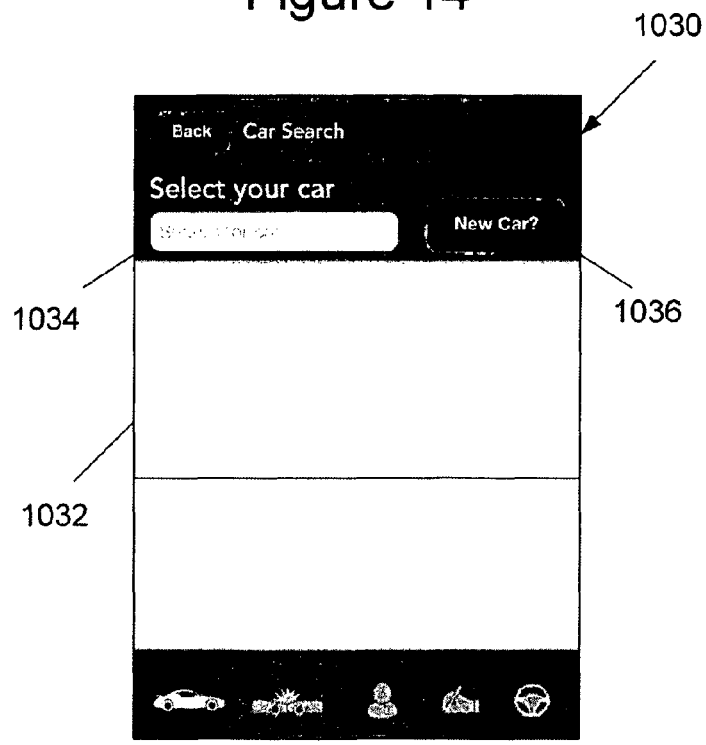

On selection of the menu button 1008 by the user, the drop down list 1010 shown in FIG. 14 is displayed which includes the following menu options:
1. Start test drive 1012;
2. Loan car 1014;
3. Return car 1016;
4. Dealership stats 1018;
5. personal stats 1020;
6. Dealership settings 1022;
7. Profile settings 1024;
8. Help 1026; and
9. Logout 1028.

The operation of each one of these components of the system 10 is described below in further detail.

1. Test Drive

On selection of the "Start test drive" function button 1012, the EDD 14 displays the car search view 1030 shown in FIG.

Figure 16:
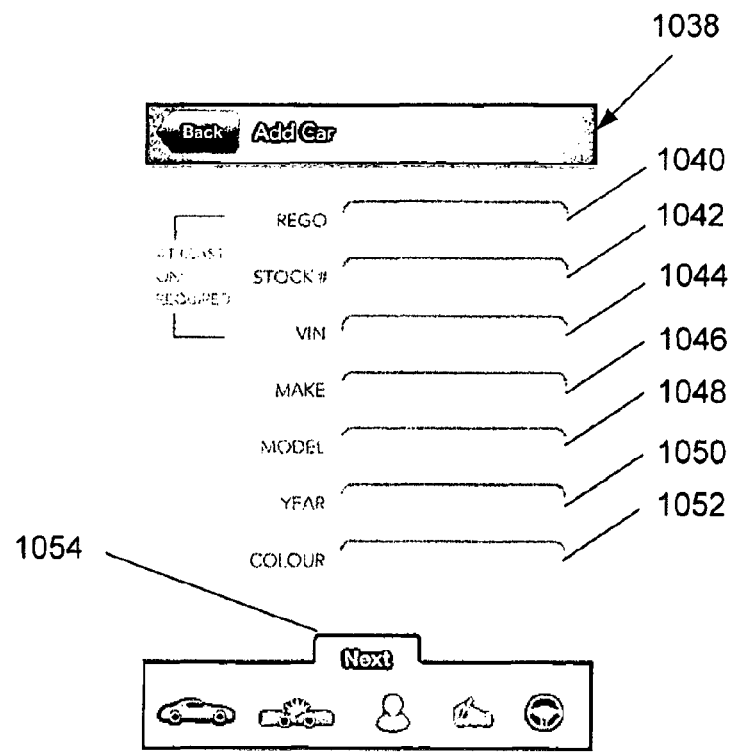

15 which includes a list 1032 of vehicles 18 currently in stock for selection by the user. In the example shown, no vehicles 18 are listed. However, advantageously, the EDD 14 would show the vehicle 18 which it has been associated with as a pre-selected option. Alternatively, the view 1030 includes a search text box 1034 and a "New Car?" function button 1036. If this button 1036 is selected, the EDD 14 displays the "Add Car" view shown in FIG. 16 which allows the user to enter the following details of the new vehicle into the system 12:
1. Rego 1040;
2. Stock #1042;
3. YIN 1044;
4. Make 1046;
5. Model 1048;
6. Year 1050; and
7. Colour 1052.

The EDD 14 records this information in the system 12 on execution of the "Next" function button 1052.

Figure 17:
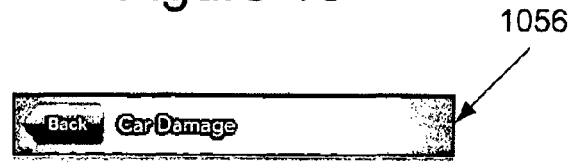
Figure 17:
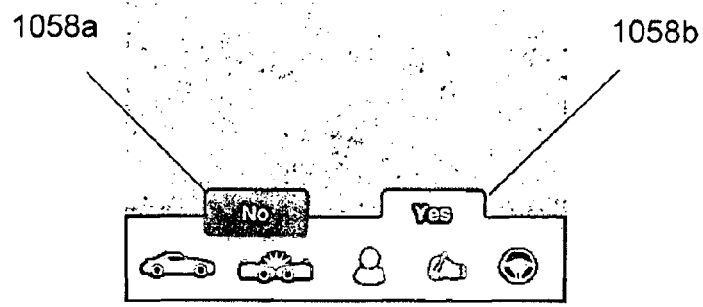

In either case, once the vehicle 18 has been selected, the EDD displays the Car Damage view 1056 shown in FIG. 17 which gives the user the opportunity to report whether he or she can see any damage on the vehicle. If no, then the user executes the "No" function button 1058a and the EDD 14 displays the Driver Details view 1060 shown in FIG. 19. Otherwise, if the "Yes" function button is executed, then the EDD 14 displays the Damage Report view 1062 shown in FIG. 18 which includes a text box 1064 for entering a description of the observed damage and an "Add Photos" function button 1066 which allows the user to take one or more photos using the apparatus 112 of observed damage and record this information. Once this process is completed, the user executes the "Next" button 1068 and the EDD 14 displays the above-mentioned Driver Details view 1060 shown in FIG. 19.

The Driver Details view 1060 includes the following text boxes for recording driver information:
1. First Name 1070;
2. Last Name 1072;
3. Email Address 1074; and
4. Phone Number 1076.

The view 1060 also includes function buttons 1078, 1080 which, when executed, respectively take photos using the apparatus 112 of front and back sides of the driver's license.

Figure 20:
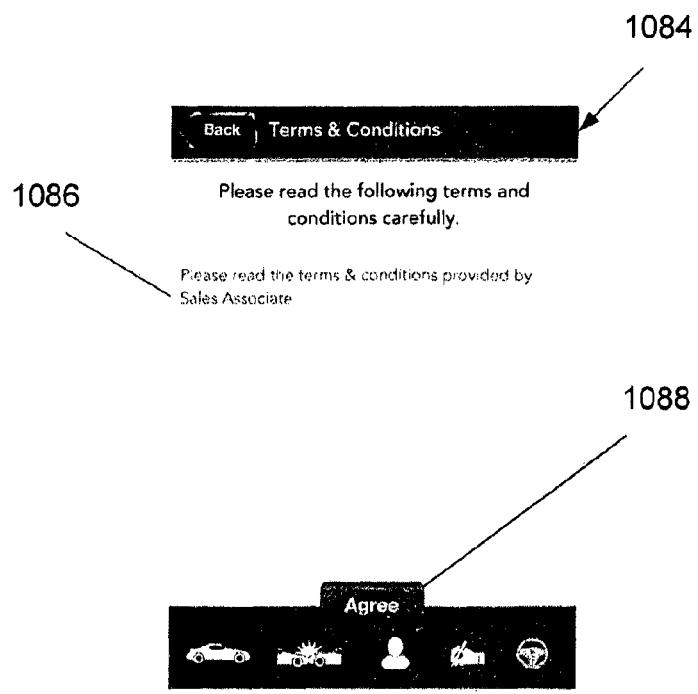
Figure 21:
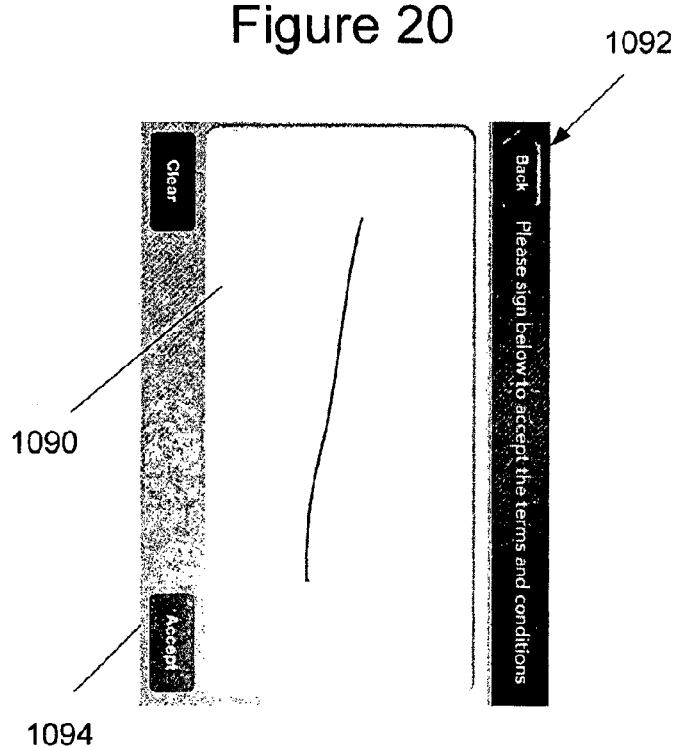
Figure 22:
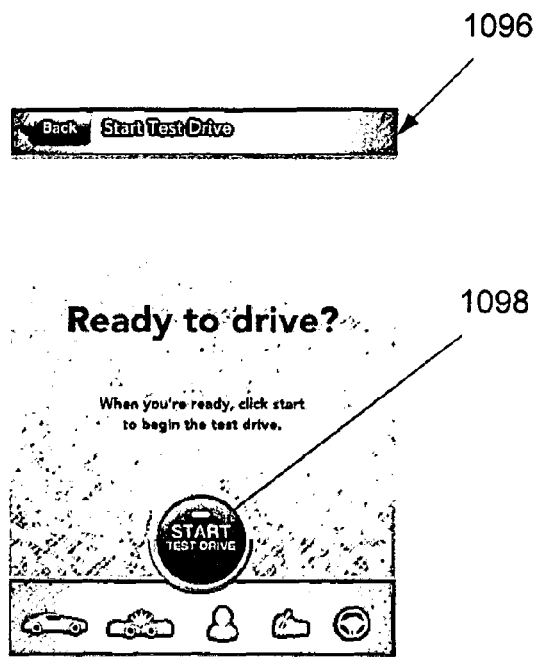

This information is recorded by the EDD 14 when the "Next" function button 1082 is executed. The EDD 14 then displays the Terms & Conditions view 1084 shown in FIG. 20 which includes a contract 1086 for the driver to read. The driver accepts the contract by executing the "Accept" function button 1088 and then signing his or her name in the signature field 1090 of the Signature view 1092 shown in FIG. 21. Once the signature has been completed, the driver executes the "Accept" function button 1094 and the EDD 14 displays the Start test drive view 1096 shown in FIG. 22. This view simply has a "Start" function button 1098 that is used to start the test drive.

Figure 23:
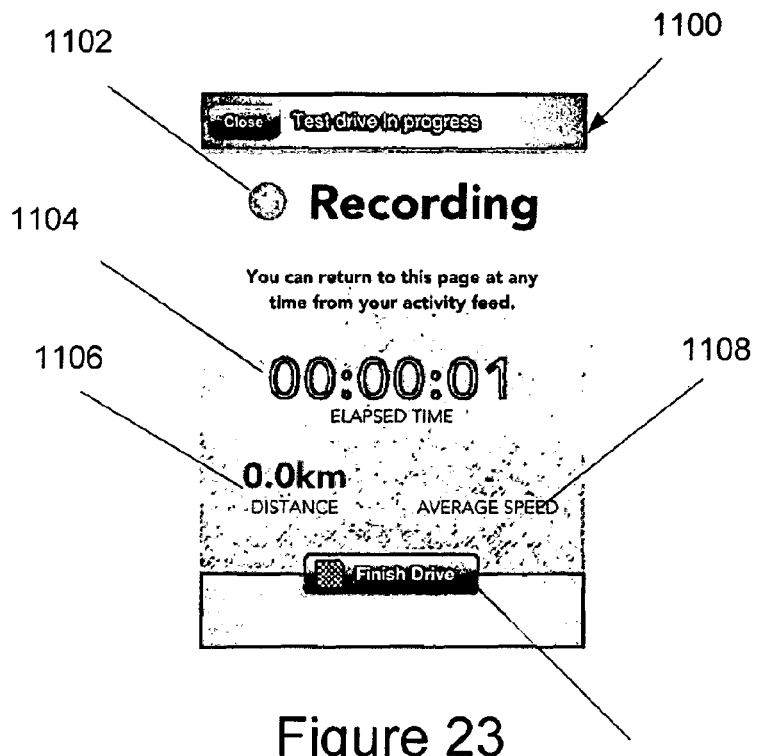

When the "Start" button is executed, the EDD 14 displays the Test Drive in Progress view 1100 shown in FIG. 23. This view includes the following information:
1. "Recording" indicator 1102;
2. Time elapsed 1104;
3. Distance traveled 1106; and
4. Average speed 1108.

The EDD 14 will also records the above mentioned logging information about the associated vehicle 18 in the above described manner. This logging information also includes vehicle location.

The test drive is completed when the sales person executes the "Finish Drive" function button 1110. The EDD 14 then again displays the Car Damage view 1056 shown in FIG. 17 which gives the user the opportunity to report whether he or she can see any damage on the vehicle. If no, then the user executes the "No" function button 1058a and the EDD 14 displays the Test Drive Completed view 1112 shown in FIG. 24.

Figure 18:
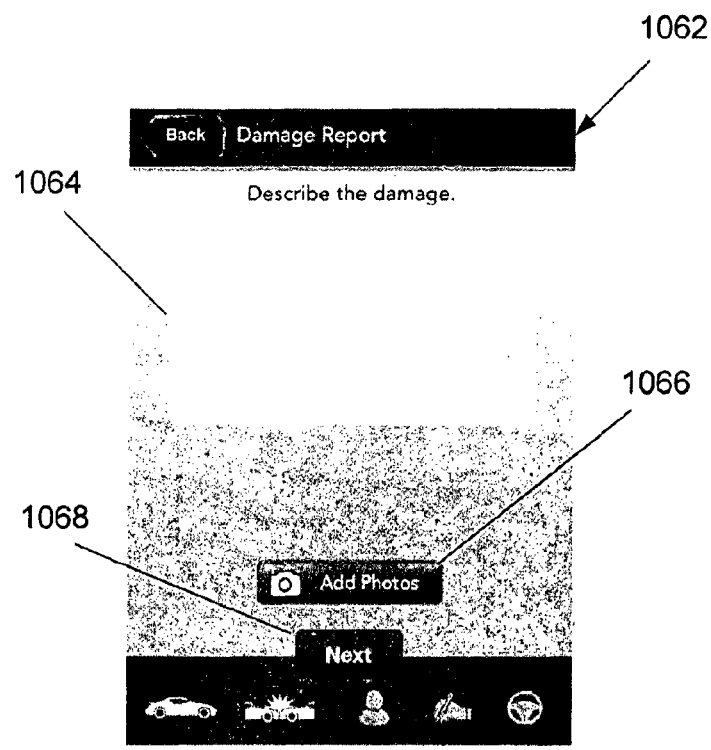
Figure 19:
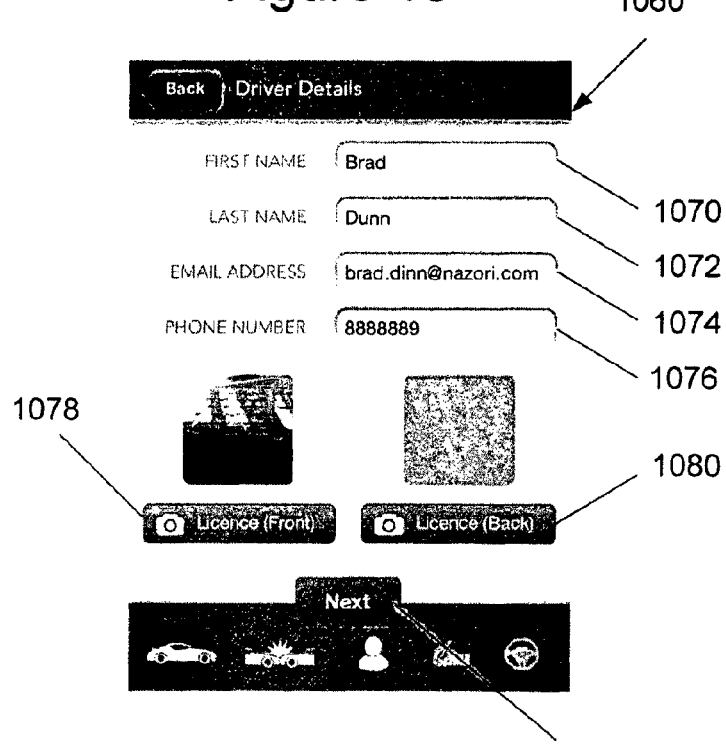

Otherwise, if the "Yes" function button 1058b is executed, then the EDD 14 displays the Damage Report view 1062 shown in FIG. 18 which includes a text box 1064 for entering a description of the observed damage and an "Add Photos" function button 1066 which allows the user to take one or more photos using the apparatus 112 of observed damage and record this information. Once this process is completed, the user executes the "Next" button 1068 and the EDD 14 displays the Test Drive Completed view 1112 shown in FIG. 24.

The Test Drive Completed view 1112 includes the total elapsed time of the test drive 1114; the total distance driven 1116 and the average speed 1118. The EED 14 also confirms that the system 10 has sent the driver an e-mail with information about the vehicle and a request for comment on the quality of the service.

Figure 24:
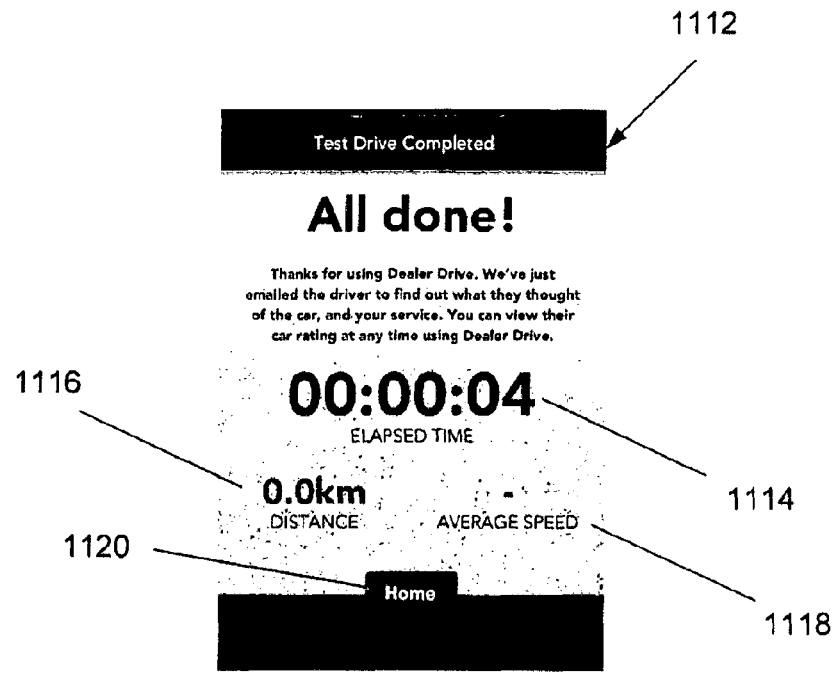
Figure 25:
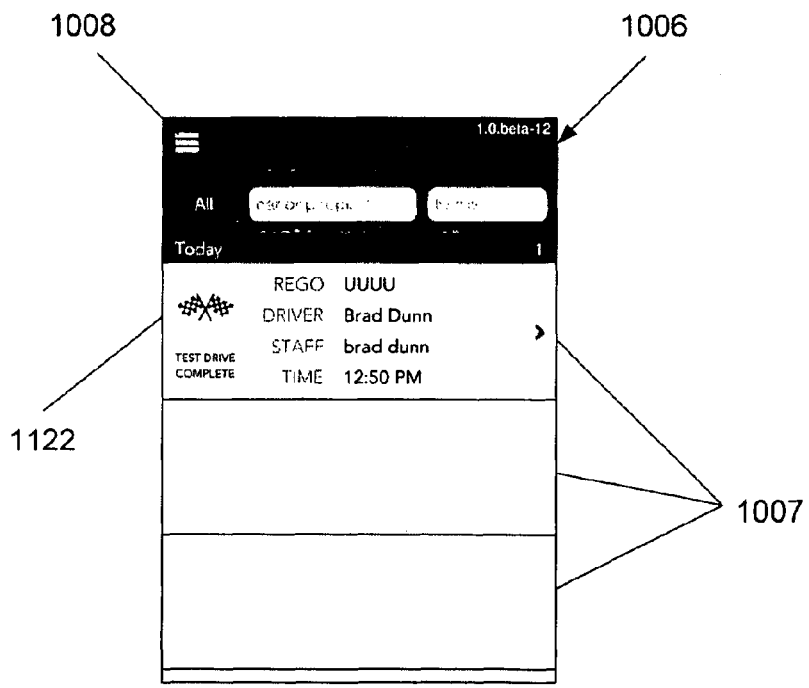

The Test Drive Completed view 1112 also include a "Home" function button 1120 which, when executed, returns user to his or her profile view 1006 as shown in FIG. 24. As can be seen, the activity feed 1007 of the profile 1006 includes an entry 1122 for the recent test drive for Brad Dunn.

2. Loan Car

Figure 26:
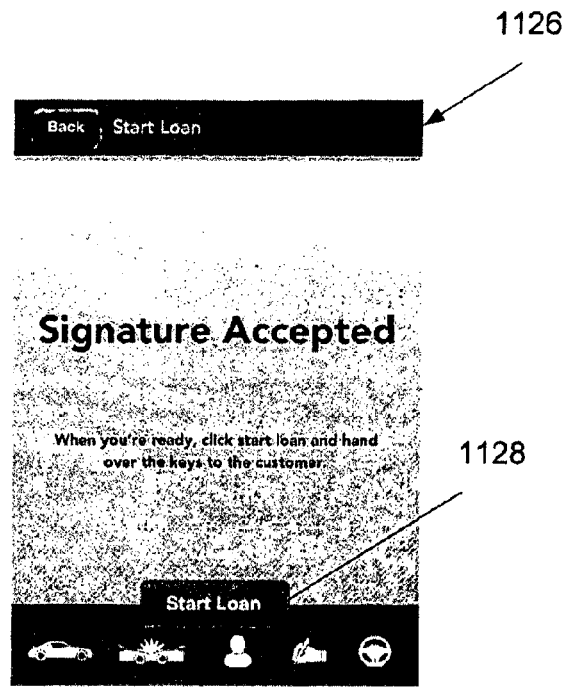
Figure 27:
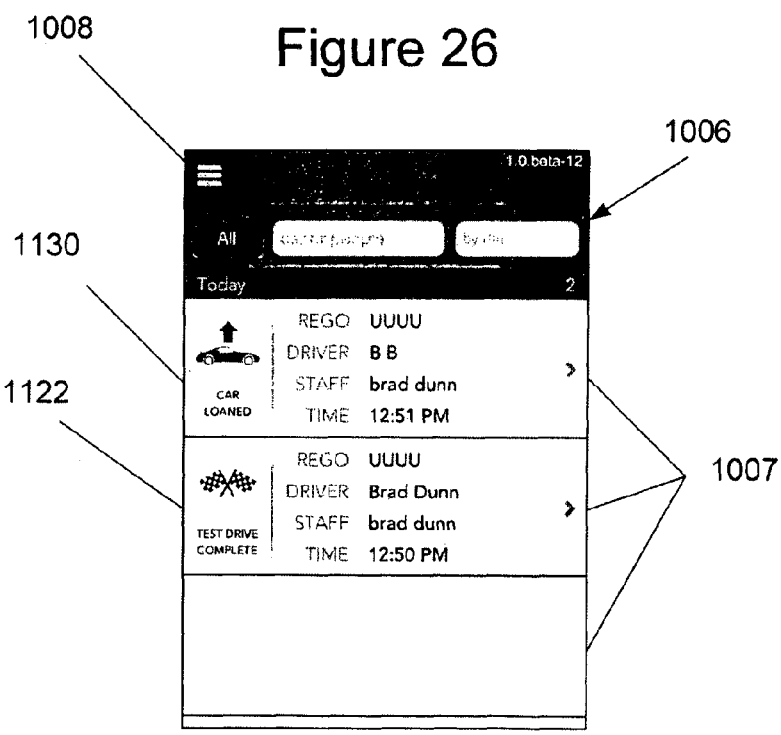

A similar process is performed by the EDD 14 when user loans a vehicle 18. For example, the user selects the "Loan Car" option 1014 from the menu 1008 and the EDD 144 steps through an analogous process to that set out for test-driving a vehicle 18. For example, the EDD 14 will perform the following steps:
1. display the Car search View 1030 on the visual display unit 118 of the EED 14 and to allow the user to search for the relevant vehicle in the above described manner;
2. display the Car Damage view 1056 on the display 118 so that the user can report any damage in the above described manner;
3. display the Driver Details view 1060 to record the driver's details in the above described manner;
4. display the Terms & Conditions view 1084 for loan vehicles 18 on the display 118;
5. display the Signature view 1092 for loan vehicles 18 on the display 118;
6. display the Start Loan view 1126 on the display 118 shown in FIG. 26 and record the details of the loan when the "Start Loan" function button 1128 is executed; and
7. display the user profile view 1006, as shown in FIG. 27. As can be seen, the activity feed 1007 of the profile 1006 includes an entry 1130 for the recent loan to Brad Dunn.

For step 1, the EED 14 preferably suggests the associated vehicle 18 as a first option of the user.

3. Return Car

Figures 28, 29:
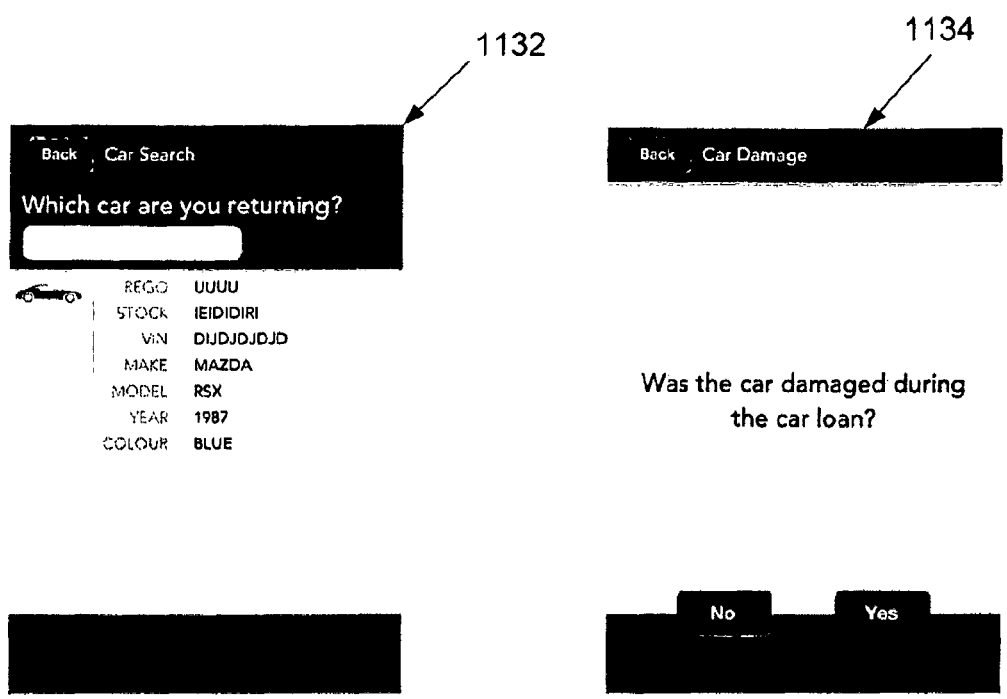
Figure 30:
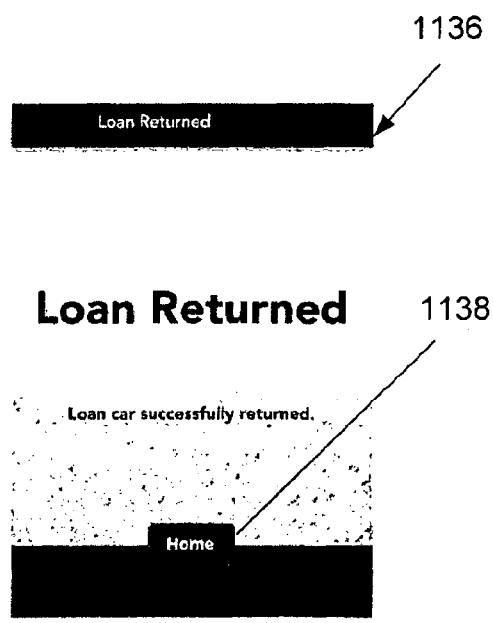

The user selects the "Return Loan Car" option 1016 from the menu 1008 and the EDD 144 performs the following steps:
1. display the Car search View 1132 shown in FIG. 28 on the visual display unit 118 of the EED 14 and to allow the user to search for the relevant vehicle in the above described manner;

2. display the Car Damage view 1134 on the display 118 so that the user can report any damage in the above described manner; and
3. display the Loan Returned view 1136 informing the user that the loan car has been successfully returned.

The Loan Return view 1136 includes a "Home" function button 1138 that returns the user to his or her profile view 1006.

With regard to step 1, the EED 14 preferably lists the associated vehicle 18 as a first option to the user.

4. Dealership Stats

Figure 31:
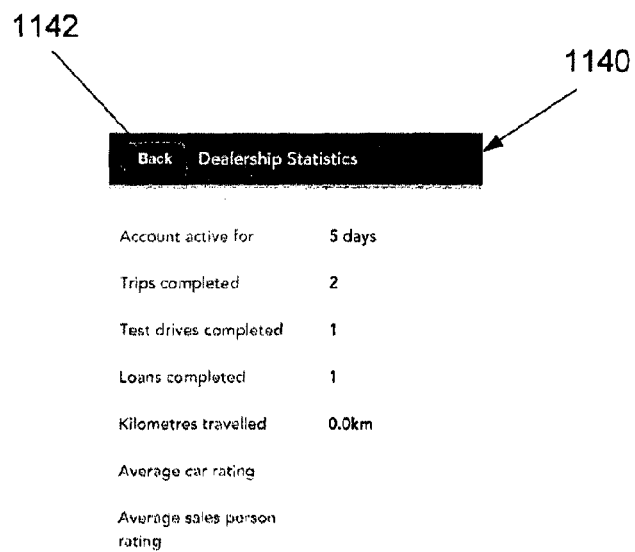

When the user selects the "Dealer Stats" option 1018 from the menu 1008, the EED 14 displays the Dealer Statistics view 1140 shown in FIG. 31 that includes the following information for the user:
1. Account active;
2. Trips completed;
3. Test drives completed;
4. Loans completed;
5. kilometers traveled;
6. Average car rating; and
7. Average sales person rating.

The user returns to the Profile view 1006 by selecting the "Back" function button 1142.

5. Personal Stats

Figure 32:
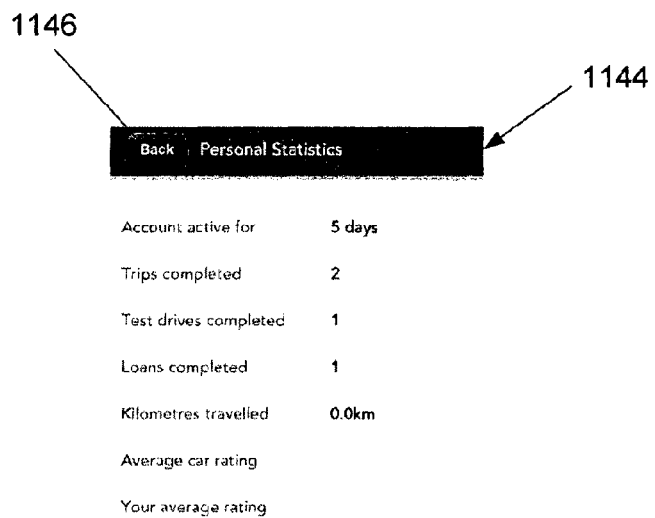

When the user selects the "Personal Stats" option 1020 from the menu 1008, the EED 14 displays the Personal Statistics view 1144 shown in FIG. 32 that includes the following information for the user:
1. Account active;
2. Trips completed;
3. Test drives completed;
4. Loans completed;
5. kilometers traveled;
6. Average car rating; and
7. Average sales person rating.

The user returns to the Profile view 1006 by selecting the "Back" function button 1146.

6. Dealer Settings

Figures 33, 34:
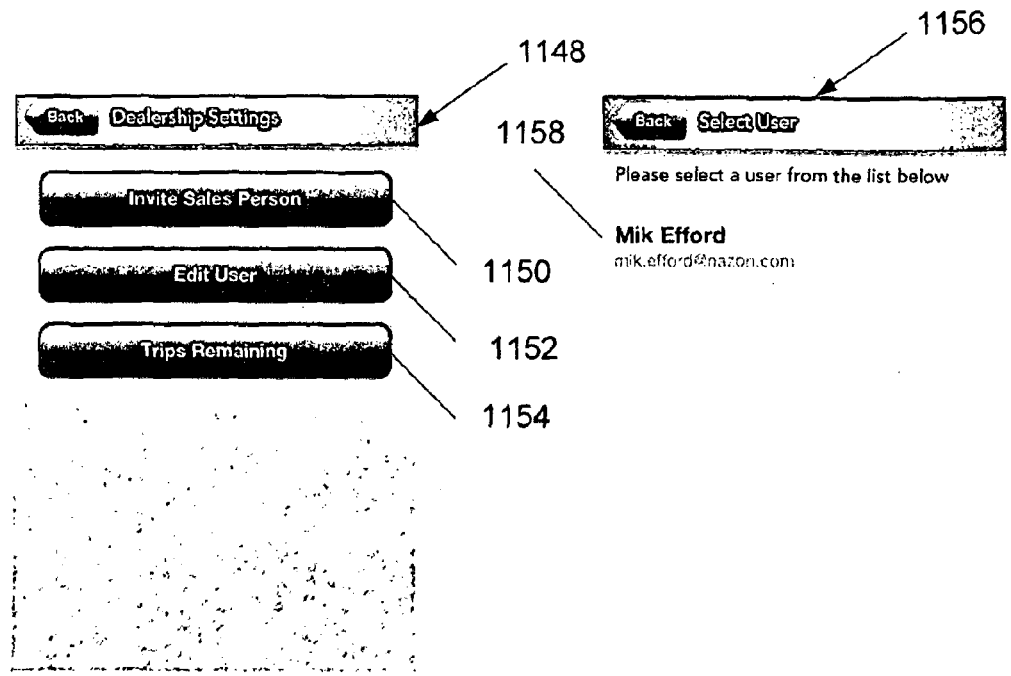

When the user selects the "Dealer Settings" option 1022 from the menu 1008, the EED 14 displays the Dealer Settings view 1148 shown in FIG. 33 that includes the following function buttons:
1. Invite Sales Person 1150;
2. Edit User 1152; and
3. Trips Remaining 1154.

The EED 14 displays the Select User view 1156 shown in FIG. 34 when the Invite sales Person function button 1150 is selected. The user can select a person from the list 1158 provided.

Figure 35:
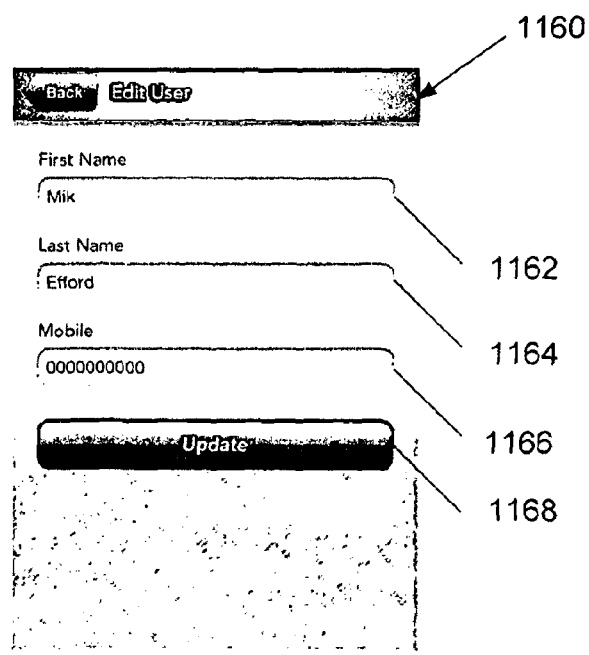

The user can edit another user's details by selecting the "Edit User" function button 1150. on selection of this button 1150, the EED 14 displays the Edit User view 1160 shown in FIG. 35. This view includes the following data fields:
1. First Name 1162;
2. Last Name 1164; and
3. Mobile 1166.

The EED 14 updates the system 10 with the user's amended information on execution of the "Update" function button 1168.

Figure 36:
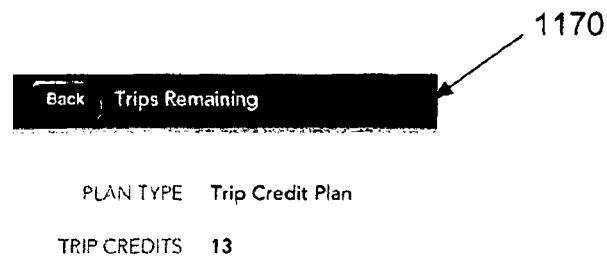

The Trips Remaining view 1170 shown in FIG. 36 is displayed by the EED 14 when the "Trips Remaining" function. button 1154 is selected. The Trips Remaining view lists the associated plan type and the trip credits.

7. Profile Settings

Figure 37:
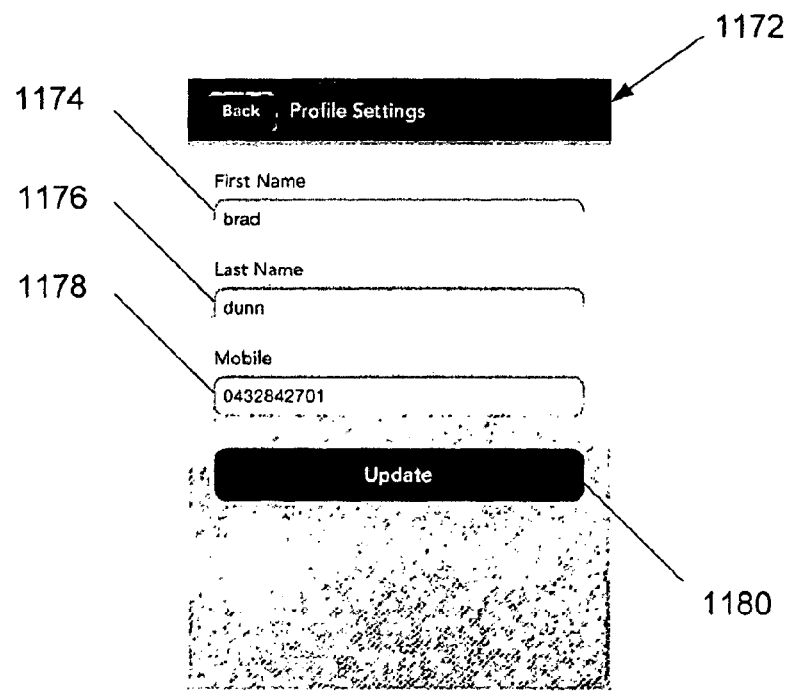

When the user selects the "Profile Settings" option 1024 from the menu 1008, the EED 14 displays the Profile Settings view 1172 shown in FIG. 37 that includes the following text boxes:
1. First Name 1174;
2. Last Name 1176; and
3. Mobile 1178.

The EED 14 updates the system 10 with the user's amended information on execution of the "Update" function button 1180.

The user returns to the Profile view 1006 by selecting the "Back" function button 1182.

Alternate Embodiment

The above-described exemplary use of the EDD 14 has been made, by way of non-limiting example, with reference to the EDD 14 receiving views published by the CCS 12 and displaying them on a display 118 for interaction with the user. As above-mentioned, the EDD 14 is preferably a smart phone, such as an iPhone, that is capable of interfacing with the CCS 12 to receive and display views published by the CCS 12. However, the EDD 14 could alternatively include an application program, stored thereon in computer readable data storage 102, that generates the same views and displays them on the display 118 for interaction with the user.

Personal Device 19

The above-described exemplary use of the EDD 14 could alternatively be performed by a user with a personal device 19. In this embodiment, the personal device 19 interacts with the CCS 12 in the above-described manner so as to receive views published by the CCS 12 and to display them on a display for interaction with the user. As above-mentioned, the user device 19 is preferably a smart phone, such as an iPhone, that is capable of interfacing with the CCS 12 to receive and display views published by the CCS 12.

The personal device 19 could alternatively include an application program, stored thereon in computer readable data storage, that generates the same views and displays them on the display for interaction with the user.

Many modifications will be apparent to those skilled in the art without departing from the scope of the present invention Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

The invention claimed is:

1. A computer program for an electronic display device (EDD) for managing vehicle information for vehicle test drives at a dealership, including one or more computer processors; non-transitory computer readable data storage; an EDD computer program stored on said data storage; and a visual display unit, the EDD program being executable by the processors to perform the steps of:
   (a) receiving vehicle data from a central computer system (CCS) representing information about an associated vehicle;
   (b) displaying said vehicle data representing information about the associated vehicle on the visual display unit:

(c) receiving data representing driver information for a driver test driving the associated vehicle including one or more of the following:
  (i) first name;
  (ii) last name;
  (iii) email address; and
  (iv) phone number;
(d) recording log information about the associated vehicle for the test drive including one or more of:
  (i) time of test drive;
  (ii) date of test drive;
  (ii) time elapsed;
  (iv) distance travelled; and
  (v) average speed; and
(e) sending said log information and said driver information to the CCS.

2. The program claimed in claim 1, the EDD program being executable by the processors to perform the steps of:
  (a) receiving an association request from the CCS for an associated vehicle;
  (b) sending an association confirmation to the CCS; and
  (c) recording said association in said data storage.

3. The program claimed in claim 1, wherein the step of recording log information includes the step of recording vehicle usage.

4. The program claimed in claim 3, wherein said vehicle usage includes the number of test drives.

5. The program claimed in claim 1, wherein the step of recording log information includes the step of recording vehicle location.

6. The program claimed in claim 1, wherein the step of recording log information includes the step of recording distance travelled during a test drive.

7. The program claimed in claim 1, including digital recording apparatus, the EDD program being executable by the processors to perform the steps of actuating the digital recording apparatus to capture personal information.

8. The program claimed in claim 7, wherein the personal information is data representing an image of a business card or a driver's licence.

9. The program claimed in claim 7, wherein the digital recording apparatus is a digital camera or a scanner.

10. The program claimed in claim 7, the EDD program being executable by the processors to perform the step of sending said personal information to the CCS.

11. The program claimed in claim 1, including an accelerometer, the EDD program being executable by the processors to perform the steps of:
  (a) generating data representing movement of the EDD; and
  (b) sending data representing movement of the EDD to the CCS.

12. The program claimed in claim 1, wherein said vehicle data includes at least one of the following:
  (a) vehicle make;
  (b) vehicle warrantee information; and
  (c) model registration number.

13. The program claimed in claim 1, wherein said vehicle data includes at least one of the following:
  (a) offered sale prices; and
  (b) vehicle odometer readings.

14. The program claimed in claim 1, wherein the vehicle data includes one or more of the dealership LMCT; odometer reading; and drive away price.

15. The program claimed in claim 1, wherein the vehicle data includes one or more of the following:
  The last owner of the motor car,
  The distance travelled by the motor car entered by the motor car trader
  The cash price of the motor car
  A statement that the cash price does not include transfer fee or stamp duty
  Car registration period
  Car built date, compliance date, Date car first registered
  Model number
  Registration number
  Engine number
  If RWC is provided
  Statement informing the prospective purchaser of the warrantee period and the cooling off period
  LMCT identification, name
  Signature of the Motorcar trader
  Space for the Purchaser to sign—upon sale of the motor car.

16. The program claimed in claim 1, wherein said vehicle data includes at least one of the following:
  (a) offered sale prices; and
  (b) vehicle odometer readings.

17. The program claimed in claim 1, wherein the vehicle data includes one or more of the following:
  The last owner of the motor car,
  The distance travelled by the motor car entered by the motor car trader
  The cash price of the motor car
  A statement that the cash price does not include transfer fee or stamp duty
  Car registration period
  Car built date, compliance date, Date car first registered
  Model number
  Registration number
  Engine number
  If RWC is provided
  Statement informing the prospective purchaser of the warrantee period and the cooling off period
  LMCT identification, name
  Signature of the Motorcar trader
  Space for the Purchaser to sign—upon sale of the motor car.

* * * * *